US008287127B2

(12) United States Patent
Gao et al.

(10) Patent No.: US 8,287,127 B2
(45) Date of Patent: Oct. 16, 2012

(54) AERIAL THREE-DIMENSIONAL IMAGE DISPLAY SYSTEMS

(75) Inventors: Chunyu Gao, Santa Clara, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 254 days.

(21) Appl. No.: 12/731,488

(22) Filed: Mar. 25, 2010

(65) Prior Publication Data

US 2010/0253917 A1     Oct. 7, 2010

Related U.S. Application Data

(63) Continuation-in-part of application No. 12/607,840, filed on Oct. 28, 2009, now Pat. No. 7,993,016, which is a continuation-in-part of application No. 12/418,137, filed on Apr. 3, 2009.

(51) Int. Cl.
*G03B 21/00* (2006.01)
(52) U.S. Cl. .......................................................... 353/7
(58) Field of Classification Search ................ 353/7, 10; 359/462–465; 348/42–60; 349/8, 9, 15
See application file for complete search history.

(56) References Cited

U.S. PATENT DOCUMENTS

| | | | |
|---|---|---|---|
| 5,621,572 A | 4/1997 | Fergason | |
| 5,671,992 A | 9/1997 | Richards | |
| 5,993,003 A * | 11/1999 | McLaughlin | 353/7 |
| 6,055,013 A | 4/2000 | Woodgate et al. | |
| 6,075,557 A | 6/2000 | Holliman et al. | |
| 6,224,214 B1 * | 5/2001 | Martin et al. | 353/7 |
| 6,381,068 B1 | 4/2002 | Harada et al. | |
| 6,543,899 B2 | 4/2003 | Covannon et al. | |
| 6,752,498 B2 | 6/2004 | Covannon et al. | |
| 6,843,564 B2 | 1/2005 | Putilin et al. | |
| 6,963,224 B2 | 11/2005 | Togino | |
| 6,999,071 B2 | 2/2006 | Balogh | |
| 7,167,308 B1 | 1/2007 | Krishnamurthy et al. | |
| 7,224,526 B2 | 5/2007 | Putilin et al. | |
| 7,239,293 B2 | 7/2007 | Perlin et al. | |
| 7,251,077 B2 | 7/2007 | Holmes et al. | |
| 7,425,070 B2 | 9/2008 | Hsu | |
| 2007/0064098 A1 | 3/2007 | Tran | |
| 2007/0146358 A1 | 6/2007 | Ijzerman | |
| 2008/0204663 A1 | 8/2008 | Balogh | |

OTHER PUBLICATIONS

Otsuka, R., et al., "Transpost: All-Around Display System for 3D Solid Image", Proc. of the ACM Symposium on Virtual Reality Software and Technology, Hong Kong 2004, pp. 187-194.
Otsuka, R., et al., "Transpost: A Novel Approach to the Display and Transmission of 360 Degrees-Viewable 3D Solid Images", IEEE Transactions on Visualization and Computer Graphics, vol. 12, No. 2, Mar.-Apr. 2006, pp. 178-185.

(Continued)

*Primary Examiner* — Thanh Luu
*Assistant Examiner* — Danell L Owens

(57) ABSTRACT

Aspects of the present invention involve novel three-dimensional display systems. Multi-view-window-based display systems are used to generate floating three-dimensional displays. In embodiments, an optical focusing element is positioned at a distance that is greater than or equal to the focal length of the optical focusing element from the viewing windows to form projected viewing windows through which a user can see a floating 3D image. In alternative embodiments, an optical focusing element is positioned at a distance that is less than the focal length of the optical focusing element from the viewing windows to form a rear-projection-like three-dimensional display system. In embodiments, a retro-reflective light diffusion screen is used in the multi-view-window-based display systems.

24 Claims, 31 Drawing Sheets

OTHER PUBLICATIONS

Moore, John R., et al., "Time-multiplexed color autostereoscopic display", SPIE Symposium on Stereoscopic Displays and Applications VII, San Jose, CA Jan. 28-Feb. 2, 1996, Published in Proc. SPIE vol. 2653, pp. 1-9.

Jones, A., et al., "Rendering for an Interactive 360° Light Field Display", ACM Transactions on Graphics (TOG), v. 26 n. 3, Jul. 2007, pp. 1-10.

Matusik, W., et al., "3D TV: A Scalable System for Real-Time Acquisition, Transmission, and Autostereoscopic Display of Dynamic Scenes", ACM Transactions on Graphics 23, Aug. 3, 2004, pp. 814-824.

Surman, P., et al., "Head Tracked Single and Multi-user Autostereoscopic Displays", Proceedings of 3rd European Conference on Visual Media Production 2006, pp. 144-152.

Van Berkel, C., et al., "Characterization and optimization of 3D-OLCD module design", Proceedings of SPIE, vol. 3012, 1997, pp. 1-8.

Peterka, T., et al., "Advances in the Dynallax Solid-State Dynamic Parallax Barrier Autostereoscopic Visualization Display System", IEEE Transactions on Visualization and Computer Graphics, vol. 14, Issue 3, May-Jun. 2008, pp. 487-499.

Cruz-Neira, C., et al., The CAVE: audio visual experience automatic virtual environment, Communications of the ACM, v. 35, n. 6, Jun. 1992, pp. 64-72.

Eichenlaub, J., A Lightweight, Compact 2D/3D autostereoscopic LCD backlight for games, monitor and notebook applications, Proceedings of the SPIE, vol. 3295, 1998.

Woodgate, G.J., et al., "Flat panel autostereoscopic displays—characterisation and enhancement", Proceedings of the SPIE, vol. 395, 2000, pp. 153-164.

* cited by examiner

AERIAL THREE-DIMENSIONAL IMAGE DISPLAY SYSTEMS

CROSS-REFERENCE TO RELATED APPLICATIONS

This application is a continuation-in-part of and claims the benefit of co-pending and commonly assigned U.S. patent application Ser. No. 12/607,840, entitled "RETRO-REFLECTIVE LIGHT DIFFUSING DISPLAY SYSTEMS," which was filed on Oct. 28, 2009, which is a continuation-in-part of and claims the benefit of co-pending and commonly assigned U.S. patent application Ser. No. 12/418,137, entitled "RETRO-REFLECTIVE LIGHT DIFFUSING DISPLAY SYSTEMS," which was filed on Apr. 3, 2009. Each of the aforementioned applications is herein incorporated by reference in its entirety.

BACKGROUND

A. Technical Field

The present invention pertains generally to displays, and relates more particularly to autostereoscopic three-dimensional (3D) displays.

B. Background of the Invention

Three-dimensional movies and television are becoming increasingly more popular. With advances in technology, such as high-definition (HD) television, consumers desire more and better features. According to the "2008 3D Television Report" released in May 2008 by Insight Media, 3D may soon be an add-on feature of high-definition television. Many display manufacturers are developing their own 3D display technologies to meet these market demands.

In the current 3D market, traditional standard two-view stereo remains as the dominant implementation. For example, head mounted displays are widely used in the military training and research community, glass-based projection displays play a key role in the large form 3D display, such as the CAVED system and PowerWall systems of Mechdyne Corporation, as well as 3D cinemas. However, the requirement of wearing a helmet or glasses limits the use of the 3D technologies. As an alternative solution, autostereoscopic display technologies have attracted increasing attention. Autostereoscopic displays use special light directing devices to create separate viewing windows in the user's space, which allow the user to see 3D images without glasses. Since the designated viewing windows form a viewing space which is significantly larger than the size of the human eye, users can move their heads freely as long as their eyes are within the viewing space.

Current stereoscopic methods used to produce the viewing windows include parallel-barrier-based displays and lenticular-based displays. However, these autostereoscopic display technologies have significant limitation.

For example, parallel-barrier-based displays suffer from several limitations. First, because parallel-barrier displays use light blocking to produce viewing windows, only a small amount of light emitted from each pixel passes through the barrier window. Second, crosstalk between views can be significant. Crosstalk refers to the overlap of viewing areas, which results when one eye sees the image intended for the other eye. When the crosstalk is significant, the brain cannot perceive the stereo effect or cannot perceive it correctly. Third, the use of small apertures in parallel-barrier-based displays can cause diffraction. This problem becomes more acute as the display resolution increases. As the display resolution increases, the barrier aperture size must be decreased, which causes more severe diffraction effects. Fourth, parallel-barrier-based displays typically suffer from limited resolution. For a display with n views, the resolution of the individual view is essentially 1/n of the original display resolution. Because the views have to divide the resolution of the original display, a parallel-barrier-based display's resolution is limited by the original resolution of the display, which is also limited by diffraction as well as the display manufacturer's capability. Fifth, since each view only sees one pixel column out of n associated with one barrier window, there are many dark pixels lines in each view, which creates a "picket fence effect" in the monocular image. Finally, parallel-barrier-based displays typically suffer from having a limited number of viewing windows. In order to generate more viewing windows, the dark slits have to be wider while the slit windows remain unchanged. Obviously, it is impossible to infinitely increase the number of viewing windows without aggregating the artifacts such as reduced brightness and picket fence effect.

Although lenticular-based displays offer some improvements over parallel-barrier-based displays, the use of lenticular sheets also has important drawbacks. Lenticular-based displays offer higher resolution compared with barrier slits; however, it is more difficult and costly to make high quality lenticular sheets than to make simple black-white barriers. In fact, the quality of the display is directly related to the quality of the lenticular sheet used in the display. Aligning a lenticular sheet with a display also requires significant effort. Furthermore, lenticular-based displays also suffer from problems that plague parallel-barrier-based displays, such as crosstalk between view windows, dark line problem, limited resolution, and limit number of viewing windows.

SUMMARY OF THE INVENTION

Accordingly, what is needed are systems and methods that provide better displays, particularly better displays that can be used for autostereoscopic displays.

Aspects of the present invention involve the use of light diffusion and retro-reflectivity to generate novel display screens. In embodiments, a retro-reflective light diffusion screen can be used to generate autostereoscopic displays by generating a plurality of viewing windows. In embodiments, each viewing window depicts a perspective image view and a 3D image can be views by viewing one perspective image view from one viewing window with one eye and by viewing another perspective image view from another viewing window with the other eye.

In embodiments, a display screen system comprising a screen that has a two-dimensional retro-reflective surface and a diffusion surface. The diffusion surface is configured with a large diffusion angle in a first direction and a small diffusion angle in a second direction. For the display screen, the first direction is preferably the vertical direction and the second direction is preferably the horizontal direction. The diffusion surface is also configured to receive an image reflected from the two-dimensional retro-reflective surface and to diffuse the image to form a viewing window corresponding to the image.

In embodiments, a display screen system comprises a retro-reflector diffuser screen and at least one additional layer. In embodiments, the additional layer may be a transparent layer between the two-dimensional retro-reflector and the light shaping diffuser. In embodiments, the additional layer may be a lenticular layer that is positioned in front of the light shaping diffuser. In yet other embodiments, the retro-reflector diffuser screen comprises a lenticular layer, a light shaping diffuser, a transparent medium layer, and a two-dimensional retro-reflector.

The display screen system can also include a plurality of projectors. Each projector has a unique position and is configured to project an image with a unique perspective view onto the screen to form a unique viewing window corresponding to the projected image. Thus, the display system forms a plurality of viewing windows corresponding to a plurality of images projected by the plurality of projectors. A user can view a three-dimensional image by viewing a first perspective image with one eye at a first viewing window selected from the plurality of viewing windows and by viewing a second perspective image with the other eye at a second viewing window from the plurality of viewing windows.

In embodiments, the display screen system also comprises a beamsplitter positioned in an optical path between at least one of the plurality of projectors and the screen to direct a projected image to the screen and to direct the projected image reflected from the screen to a location to form a viewing window that is spatially separate from the at least one of the plurality of projectors. Such configurations remove the projector as an obstacle in the viewing window.

In embodiments, the display system also includes a second screen retro-reflective light diffusing screen positioned at an optically mirror-conjugated position relative to the first screen to increase the brightness of the image at a viewing window.

In embodiments, the display system includes a polarization-sensitive beamsplitter positioned in an optical path between at least one of the plurality of projectors and the screen to direct a projected image to the screen and a quarter-wave plate positioned in an optical path between the screen and the beamsplitter.

In embodiments, the display system includes a computing device communicatively coupled to the plurality of projectors to coordinate projection of images. The computing device may also include one or more datastores for storing images to be projected. It should be noted that the images to be projected may be still images, video images, or both.

Embodiments of the present invention also include methods for making an autostereoscopic display system according to teachings presented herein. For example, in embodiments, an autostereoscopic display system can be formed by positioning a retro-reflective light diffusing screen to receive projected images from a plurality of projectors. Each projector has a unique position and is configured to project an image with a unique perspective view onto the screen to form a viewing window corresponding to the projected image. A plurality of viewing windows are formed corresponding to the plurality of images projected by the plurality of projectors. The plurality of viewing windows are positioned such that a user can view a three-dimensional image by viewing a first perspective image with one eye at a first viewing window selected from the plurality of viewing windows and by viewing a second perspective image with another eye at a second viewing window.

Aspects of the present invention also include systems and methods for generating floating three-dimensional displays. In embodiments, an optical focusing element is positioned at a distance that is greater than or equal to the focal length of the optical focusing element from the viewing windows of a multi-view-window-base display system to form projected viewing windows from which a user can see a floating 3D image. In alternative embodiments, an optical focusing element is positioned at a distance that is less than the focal length of the optical focusing element from the viewing windows to form a rear-projection-like/light-field three-dimensional display system. In embodiments of the aerial three-dimensional displays, one of the embodiments of the retro-reflective light diffusion screen presented herein is used in the multi-view-window-based display systems.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting, and are also not drawn to scale. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
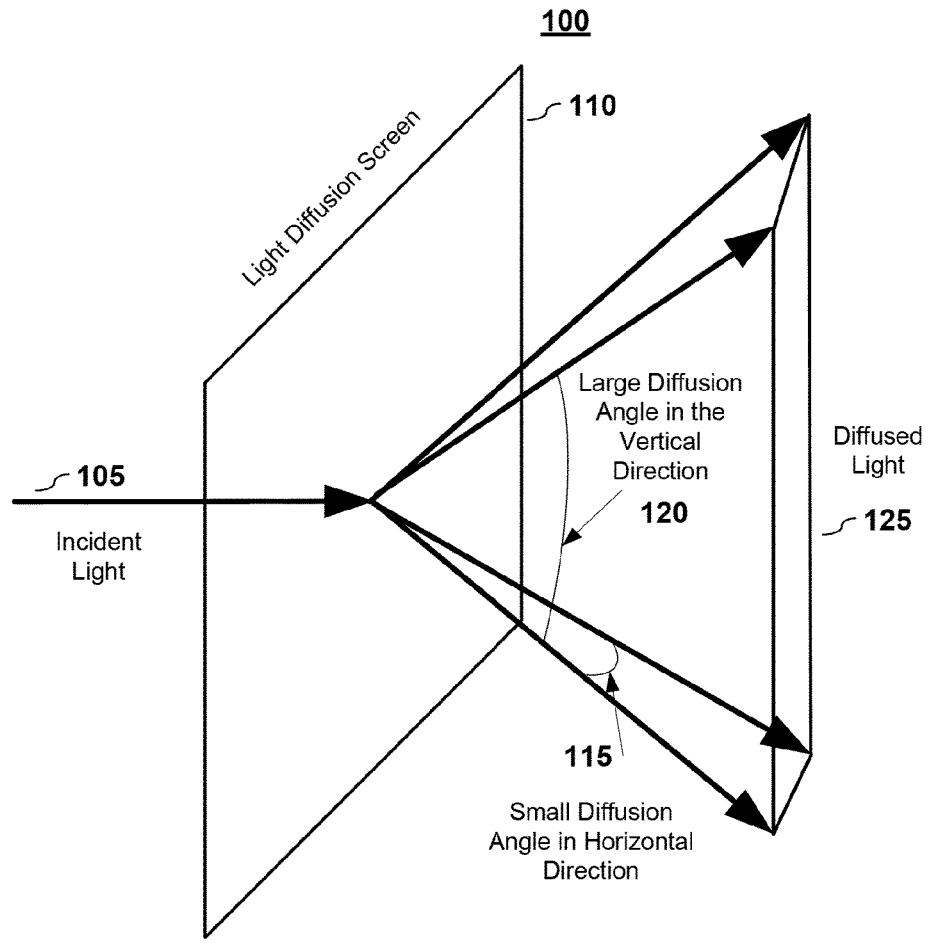
FIG. 1 illustrates the operation of a light diffusion screen according to various embodiments of the invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways. Accordingly, the examples described below are illustrative of specific embodiments of the invention and are meant to avoid obscuring the invention.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments. It shall also be understood that the terms "image" or "images" as used herein shall mean still images, video images, or both.

A. Overview

Most stereoscopic viewing techniques rely on binocular parallax cues to generate a three-dimensional (3D) image. Binocular parallax refers to seeing a stereo image pair (i.e., two different perspectives) of the same 3D object or objects. A head mounted display is one of such viewing device, in which the user sees two separate stereo images through two separated optical paths. Anaglyphic glass, shutter glass, and polarized glass are widely used to separate the stereo images displayed on a single screen or printed on the paper.

Autostereoscopic display techniques also rely on parallax depth cues. However, instead of separating the stereo views with glass in front of the user's eyes, most of autostereoscopic displays try to control the light path in display space to generate viewing windows in the user's space. In each viewing window, only one monocular image can be observed. The viewing windows further form viewing zones. Since the size of the viewing zone is significantly larger than the size of a human eye, the user can freely move his/her head within the viewing zone. Most of the existing autostereoscopic display systems are based on either parallel-barrier techniques or lenticular techniques.

1. Parallel-Barrier-Based Display

The fundamental design using a parallel barrier is to place strips to block light emitted from the display. A black-white mask grid is typically placed in front of the display. Each small white grid acts as a pinhole which maps pixels into the viewing space and allows a user to see the pixels from certain viewing angle (i.e., creating a viewing window), while the black grid blocks the neighbor pixels from that viewing angle. As a result, in a left viewing window, the user sees one set of pixels on the display, and in a right viewing window, the user sees the other set of pixels on the display. The left viewing window and the right viewing window together form one viewing zone. More than one viewing zone can be formed. Also, by increasing the resolution of the display and associating more pixels to each barrier slits, multiple viewing windows can be created within a single viewing zone.

As previously noted, parallel-barrier-based displays have several drawbacks. These drawbacks include: reduced brightness, crosstalk between views, diffraction effect caused by a small window, limited resolution, picket fence effect in the monocular image, image flipping artifact when crossing a viewing zone, and a limited number of viewing windows.

First, because parallel-barrier-based displays use a light block strategy, only a small amount of light emitted from each pixel passes through the barrier window. Thus, the brightness of the viewed image is reduced. Attempts to reduce the brightness problem have included placing the barrier mask behind the display. The light is modulated by the barrier before reaching the display pixels.

Second, crosstalk between views can be significant. Crosstalk refers to the overlap of viewing areas, which can result in one eye seeing the image intended for the other eye. When the crosstalk is significant, the brain cannot perceive the stereo effect or cannot perceive it correctly. Attempts to minimize the crosstalk artifact involve choosing a barrier pitch for the barrier mask or placing the barrier behind the display.

Third, the use of small apertures in parallel-barrier-based displays can cause diffraction. This problem becomes more acute as the display resolution increases. As the display resolution increases, the barrier aperture size must be decreased, which causes more severe diffraction effects. Thus, the aperture size of the barrier is limited by the diffraction limit.

Fourth, parallel-barrier-based displays typically suffer from limited resolution. For a display with n views, the resolution of the individual view is essentially 1/n of the original display resolution. Because the views have to divide the resolution of the original display, a parallel-barrier-based display's resolution is limited by the original resolution of the display, which is also limited by diffraction as well as the resolution that can be achieved by the display manufacturer.

Fifth, since each view only sees one pixel column out of n associated with one barrier window, there are many dark pixels lines in each view. For a two-view case, the dark line is a single pixel width, interlacing in these bright pixels. The dark pixel lines create a "picket fence effect" in the monocular image. Attempts to reduce the picket fence artifact involve placing the barrier lines at an angle with respect to the pixel column of the display.

Sixth, these displays can suffer from image flipping artifact. The imaging flipping artifact is caused by the improper alignment of a user's eyes with the viewing windows. In the two-view display systems, a user will see a flipped set of stereo images if the user's left eye is in a right viewing window and the user's right eye is in a left viewing window. For a multiple-view display system, such flipping artifacts happen when a user crosses a viewing zone.

Finally, parallel-barrier-based displays typically suffer from having a limited number of viewing windows. In order to generate more viewing windows, the dark slits have to be wider while the slit windows remain unchanged. It is impossible to increase the number of viewing windows without increasing artifacts, such as reduced brightness and picket fence effect.

2. Lenticular-Based Displays

As noted above, one drawback of parallel-barrier-based displays is low brightness due to the narrow vertical slits of the barrier. One solution to this problem is to use lenses to improve the light gathering. One form of lens that is used is a lenticular sheet, which contains a set of cylindrical lenses placed side-by-side. To use a lenticular sheet for displaying 3D images, the sheet is vertically aligned with a 2D display. Similar to parallel-barrier displays, if aligning two sets of pixels (e.g., left eye pixels and right eye pixels), two viewing windows can be created to form one viewing zone. Multiple viewing zones (with L & R viewing windows) can also be created. If aligning multiple pixels with each lens, multiple viewing windows can be created in one viewing zone. Since the lenses in the lenticular sheet are in a cylindrical shape, only horizontal parallax is created. In addition to an improvement over parallel-barrier-based displays with respect to light-gathering ability, the lenticular sheet also can offer higher resolution comparing with barrier slits.

Although lenticular-based displays have better brightness and resolution possibilities as compared to parallel-barrier-based displays, lenticular-based displays present their own disadvantages. First, the quality of the display is dependent upon having a high quality lenticular sheet. However, it is significantly more difficult and costly, particularly as compared to barrier masks, to manufacture high quality lenticular sheets. Additionally, aligning a lenticular sheet with a display also requires significant effort. Furthermore, lenticular-based displays also suffer from problems that plague parallel-barrier-based displays, such as crosstalk between view windows, picket fence problem, limited resolution, image flipping, and limited number of viewing windows.

3. Light Diffusion Based Displays

A third type of multiple-view 3D display uses light shaping diffuser (LSD) technology. Examples of devices utilizing light shaping diffusers include a light-field display called HoloVizo™ developed by Holografika of Budapest, Hungary and a 3D light-field display developed by the Institute for Creative Technologies at the University of Southern California. The light shaping diffuser is a one-dimensional light diffuser which is used for optical communication device and LCD display backlighting. When illuminated by a projector, the light shaping diffuser has small diffusion in the horizontal direction and large diffusion in the vertical direction Holografika takes advantage of the one-dimensional diffusion property in its HoloVizo™ display. The display uses a number of projectors that illuminate a LSD screen. In the horizontal cross-section view, a viewer can only see one very thin slit of images from each projector, assuming that the screen diffuses light in the vertical direction only. To generate one viewing perspective, these thin slits from different projectors have to be mosaiced together. Therefore, the display requires many projectors to work together. For the HoloVizo™ display system, as many as 50 projectors are used for the prototype. Assuming a horizontal diffusion angle of 1 degree, it requires about 60 projectors to generate a 60 degree field-of-view multiple-view display.

The light-field display developed by the Institute for Creative Technologies at the University of Southern California consists of a high-speed video projector, a spinning mirror covered by a holographic diffuser, and field-programmable-gate-array circuitry to decode specially rendered Digital Visual Interface (DVI) video signals. The high-speed video projector and a spinning mirror covered by a holographic diffuser generate a 360 degree view. The light-field display developed by the Institute for Creative Technologies at the University of Southern California has similar properties as the HoloVizo™ display.

Although these displays do not share all of the drawbacks of the parallel-barrier-based and lenticular-based displays, there are some inherent problems with these approaches. For example, there can be crosstalk problem, difficult system calibration, and extra-cost for rendering.

First, for the HoloVizo™ display, there can be crosstalk problems. The crosstalk artifact can be introduced by the light diffuser. An ideal diffuser should be a perfect low pass filter (i.e., perfect rectangular). However, the actually material has a Gaussian-like diffusion pattern. As a result, there can be crosstalk between two neighbor thin slits, which could significantly blur the images or generate a zigzag image.

Second, both systems require extremely specialized and complex components and require complex system calibration. For example, since the images in the HoloVizo™ display are mosaiced from image segments of many projectors, these projectors must be properly aligned and calibrated. The light-field display developed by the Institute for Creative Technologies at the University of Southern California also requires specialized equipment and specialized set-up.

Finally, there are extra costs for image rendering. For the HoloVizo™ display, the rendering costs are caused, at least in part, by its special image mosaic requirement. The images displayed on the projectors are not the perspective images of a regular 3D movie or the images rendered by the standard OpenGL software. Thus, extra steps have to be taken to generate proper images for each projector. And, for the light-field display developed by the Institute for Creative Technologies at the University of Southern California, the system requires specially rendered DVI video signals.

B. Embodiments of Autostereoscopic Display

Embodiments of the present invention include using light shape diffusion with retro-reflection. Such configurations have several benefits over prior autostereoscopic displays. First, such systems can use full resolution of the projectors and can display bright images. Systems of the present invention generate each view image with only one projector and do not require mosaicing the views from multiple projectors when the user views images at the designated viewing location. Additionally, the images do not require specially rendered video signals. As a result, the special post-rendering processes mentioned above are not necessary. Compared with parallel-barrier-based and lenticular-based displays, the present systems do not suffer from the same resolution limits, are typically much brighter, and are theoretically able to create a large number of viewing windows. Additional benefits shall be apparent to one skilled in the art.

C. Retro-reflective Vertical Light Diffusion Screen (RRVLD)

In embodiments, an autostereoscopic display of the present invention comprises two layers. The first layer comprises a one-dimensional (1D) light diffusion material that has a small diffusion angle in one direction and a large diffusion angle in the other direction. FIG. 1 depicts an example of a light diffusing material according to embodiments of the invention.

As showing in FIG. 1, an incident light ray 105 that passes through the light diffusing material 110 is diffused by a small angle 115 in the horizontal direction but by a large angle 120 is the vertical direction. For 3D display applications, a small diffusion in the horizontal direction is preferred, while in the vertical direction a large diffusion is preferred. Therefore, this type of diffusion screen can be referred to as a vertical light diffusion screen.

Figure 2:
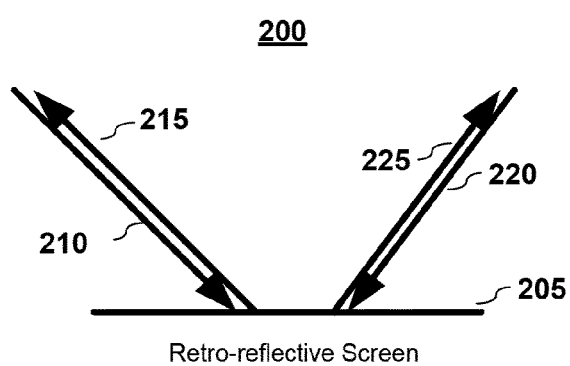
FIG. 2 illustrates the operation of a retro-reflective screen according to various embodiments of the invention.

The second layer of the screen is a retro-reflective material, which reflects a light ray back in the incident direction. FIG. 2 depicts an example of a retro-reflective material and the interaction with light rays. An incident light ray 210 or 220 strikes the retro-reflective material 205 and is reflected. The reflected light ray is reflected back at the same, or nearly the same, angle as the incident light ray. Thus, the incident light ray 210 has a retro-reflective ray 215 that is reflected back to along the direction of the incident ray 210. And, the incident light ray 220 has a retro-reflective ray 225 that is reflected back to along the direction of the incident ray 220.

Figure 3:
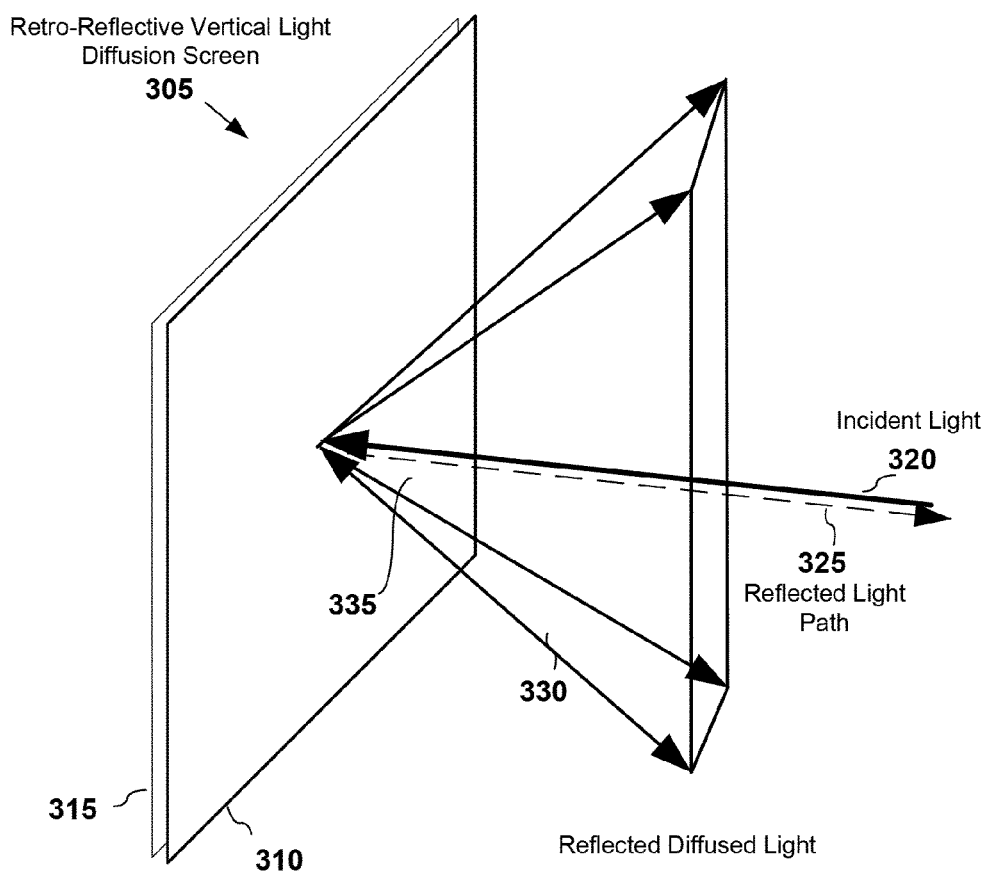
FIG. 3 illustrates the operation of a retro-reflective vertical light diffusion screen according to various embodiments of the invention.

FIG. 3 depicts a retro-reflective vertical light diffusion screen 300 according to various embodiments of the invention. The screen 305 illustrated in FIG. 3 is formed of a light diffusion material 310 combined with a retro-reflective material 315. In embodiments, a one-dimensional light diffusion material, such as Light Shaping Diffusers (LSD®) produced by Luminit LLC of Torrence, Calif., may be used. A light shaping diffusion material may have diffusion angles of 60°× 1°, although one skilled in the art shall recognize that other diffusion angles may be used. In embodiments of the 3D display system, the light shaping diffusion material is oriented with the 60° diffusion angle in the vertical direction and with the 1° diffusion angle in the horizontal direction. In embodiments, a retro-reflective material, such as 3M™ Scotchlite™ Reflective Material, produced by 3M Corporation of St. Paul, Minn. or the photoelectric control products, such as its P66 and AC1000 with metalized back produced by Reflexite Americas of New Britain, Conn., may be used.

As depicted in FIG. 3, light 320 directed toward the retro-reflective vertical light diffusion screen 305 passes through the diffusion material and is retro-reflected back to along its incident direction 325 (or substantially along the incident direction). The retro-reflected light is then diffused by the light diffusion material 310. The light diffusion material 310 is configured to diffuse the retro-reflected light a small amount in the horizontal direction 330 and a large amount into vertical direction 335. Thus, the resulting diffused light is in a fan shape after it passes through the diffusion material.

D. Embodiments of Display Systems

1. General Display System Embodiments

Figure 4:
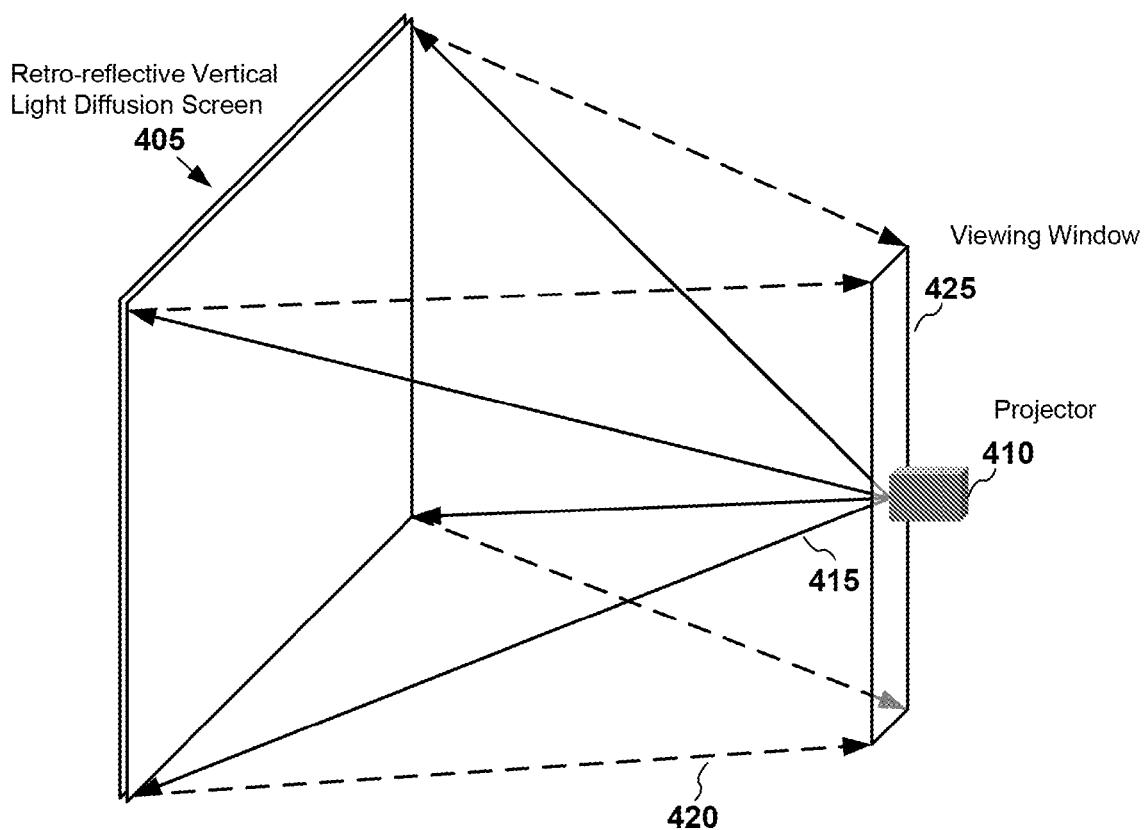
FIG. 4 illustrates a display system with a retro-reflective vertical light diffusion screen according to various embodiments of the invention.

FIG. 4 depicts a display system 400 according to various embodiments of the present invention. Shown in FIG. 4 is a retro-reflective vertical light diffusion screen 405 and a projector 410. The retro-reflective vertical light diffusion screen 405 is used as a display screen. The light rays 415 emitted from the projector are retro-reflected back to the projector 410 and create a viewing window 425 which overlaps with the projector. The screen 405 is configured such that the reflected light is diffused with a large diffusion angle in the vertical direction and with a small diffusion angle in the horizontal direction. Due to the vertical diffusion effect, the viewing window is a vertical slit centered with the aperture of the projection lens. The width of the slit 425 is a function of the horizontal diffusion angle of the screen, the distance from the projector, and the aperture size of the projection lens. The following equation sets forth the calculation for the width of the vertical slit:

$$W = D_a + 2 \cdot Z_p \cdot \tan\left(\frac{\omega}{2}\right), \text{ where}$$

W is the width of the slit;
$D_a$ is the aperture size of the projection lens;
$Z_p$ is the distance from the projector to the screen; and
$\omega$ is the horizontal diffusion angle of the screen.

It shall be noted that an advantage of having a large vertical diffusion angle is that the viewing window is extended. Without an extended viewing window, the viewing window would coincide with the projector lens, thereby making it not possible for an individual to view the reflected image. By extending the viewing window in a vertical direction, a user can view the image in the viewing window either above or below the projector 410.

Figure 5:
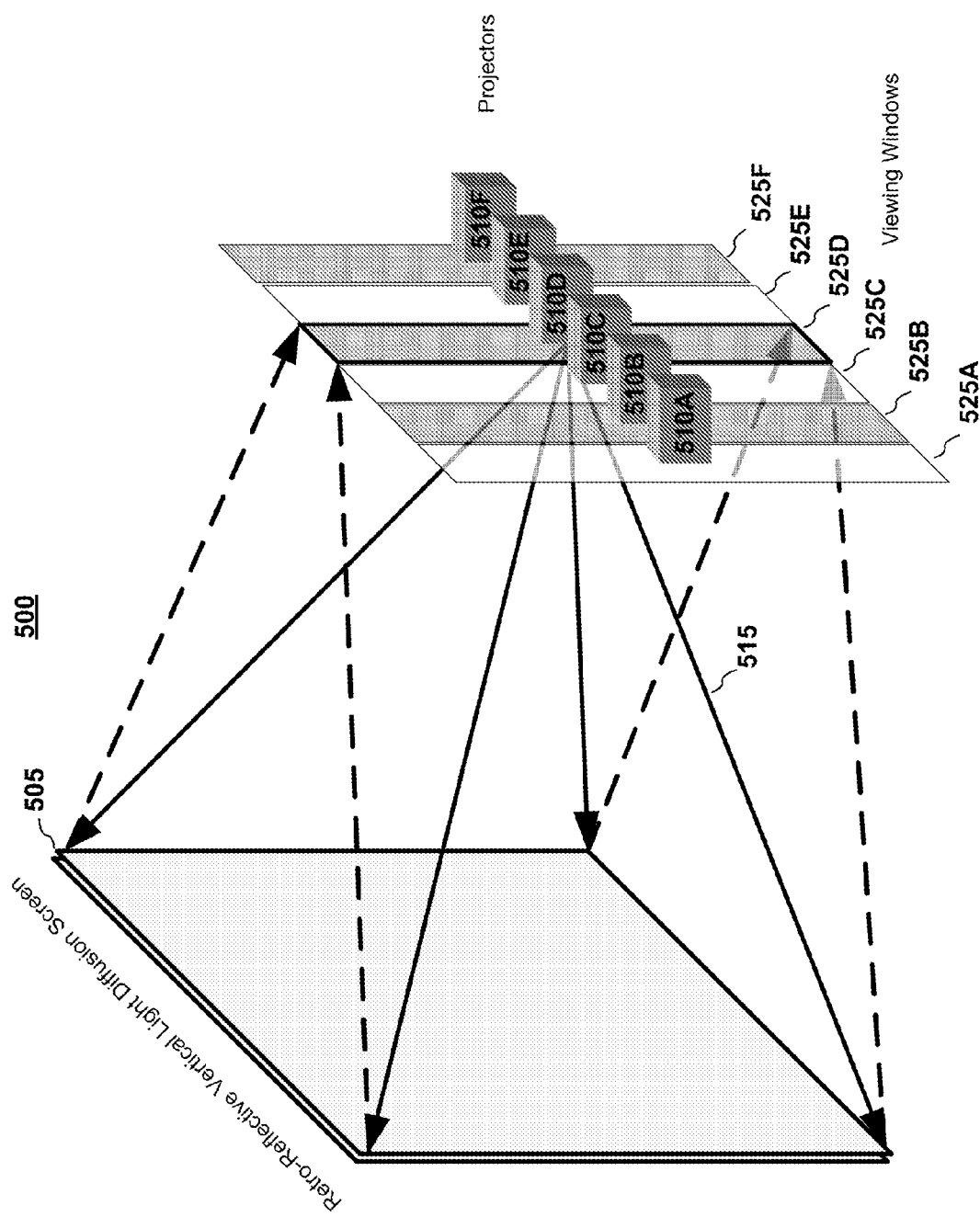
FIG. 5 illustrates a multi-projector display system with a retro-reflective vertical light diffusion screen according to various embodiments of the invention.

FIG. 5 depicts a 3D display system 500 according to various embodiments of the present invention. Shown in FIG. 5 is a retro-reflective vertical light diffusion screen 505 and a set of projectors 510A-F. It should be noted that although FIG. 5 depicts six projectors, additional or fewer projectors could be used. The retro-reflective vertical light diffusion screen 505 is used as the display screen in a similar manner as described with reference to FIG. 4. Namely, the light rays 515 emitted from a projector 510x are reflected back to the projector 510x and create a viewing window 525x overlapped with the projector. For example, the light from projector 510A is reflected and diffused by the screen 505 to form viewing window 525A. This result is same for each projector in the display system 500, wherein each projector 510A-F generates a corresponding viewing window 525A-F, respectively. Thus, by adding more projectors, more such viewing windows are created.

The display system depicted in FIG. 5 generated six distinct viewing windows. Each viewing window displays an image from a corresponding projector. By displaying a set of images captured from multiple perspectives on the screen through the projectors, a user can see 3D through these viewing slits or windows. For example, if a user views one image in one viewing window with one eye and views another perspective image in another viewing window with her other eye, then the user will perceive a 3D image. In embodiments, the width of a slot can be sufficiently small that a user does not perceive a monocular image by viewing the same image in the same viewing window with both eyes.

One skilled in the art shall recognize that there are several advantages to a display system of the kind depicted in FIG. 5. First, the images are bright. Due to the one-dimensional light diffusion, a user will see an image that is much brighter than the image on a regular diffusion screen or using other stereoscopic methods like parallel-barrier-based displays.

Second, the display screen can be configured into different shapes. Due to the retro-reflective property of the material, the screen shape could take arbitrary forms, such as regular planar, cylindrical shape, spherical shape, or almost any irregular shape. These shape variations do not affect the refocusing property of the retro-reflective screen.

Third, the display system is easily scalable. For example, more viewing windows can be generated by simply adding more projectors.

Fourth, the display system does not have the resolution limitations of prior solutions. Even though all the images are projected on the same screen, each image is only seen in the designated viewing window; therefore, the resolution can be as high as the resolution of the projector.

Fifth, the display system does not suffer from the picket fence effect. Because the user perceives one full resolution image from a single projector at each viewing window, there is no picket fence effect in the image.

Sixth, the display system does not suffer from an image flipping effect. The flipping effect occurs when a user moves his head across the viewing zones and perceives a right image in his left eye and a left image in his right eye. The display system does not have repeated viewing zones with specific stereo pair images and therefore does not have image flipping problems. Rather, each viewing window displays a perspective view image and any pair of images forms a 3D view. For example, in embodiments, the viewing windows may have a progression of perspective view images, wherein any two images form a 3D view.

Finally, the display system can potentially have an infinity number of viewing windows. Although theoretically the display system can generate an infinity number of viewing windows, the number of viewing windows that can be generated depends upon the horizontal diffusion angle of the diffusion material, the distance from the projector to the screen and the size of the projector.

2. Compact Design Embodiments

Figure 6:
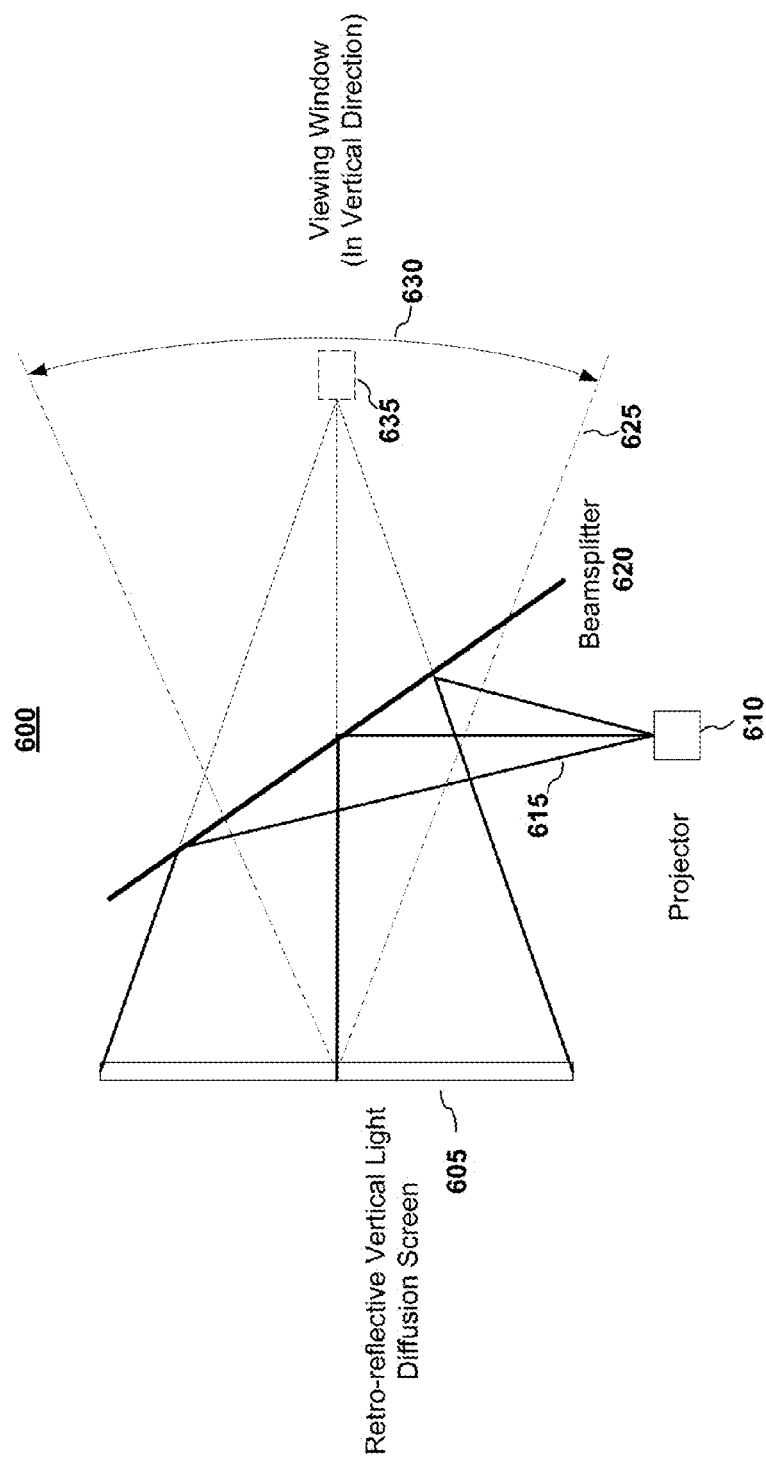
FIG. 6 illustrates an alternative embodiment of a display system with a retro-reflective vertical light diffusion screen according to various embodiments of the invention.

FIG. 6 depicts an alternative embodiment of a display system according to various embodiments of the invention. Illustrated in FIG. 6 is a more compact design for a display system 600. The depicted display system 600 comprises a retro-reflective vertical light diffusion screen 605 and a projector 610. Instead of having the projector 610 project an image 615 directly on the screen 605, the projector 610 projects an image onto a beamsplitter 620. The light reflects off the beamsplitter 620 or is split by the beamsplitter 620 onto the retro-reflective vertical light diffusion screen 605. The retro-reflected light, or at least a portion of the retro-reflected light, passes through the beamsplitter 620 to create a view window 630 where a virtual position of the projector 635 is located. It shall be noted that using a beamsplitter to fold the light path has at least two benefits. First, the view window 630 is not occluded by the projector since the view window is moved to a virtual location 635 of the projector. And second, the display system has a compact design. In embodiments, a first surface mirror could be inserted in the optical path to further fold the light path, if necessary. For example, a mirror can be used to bend the light path and allowing the projector to be moved closer to the screen.

3. Dual Screen Display System Embodiments

Figure 7:
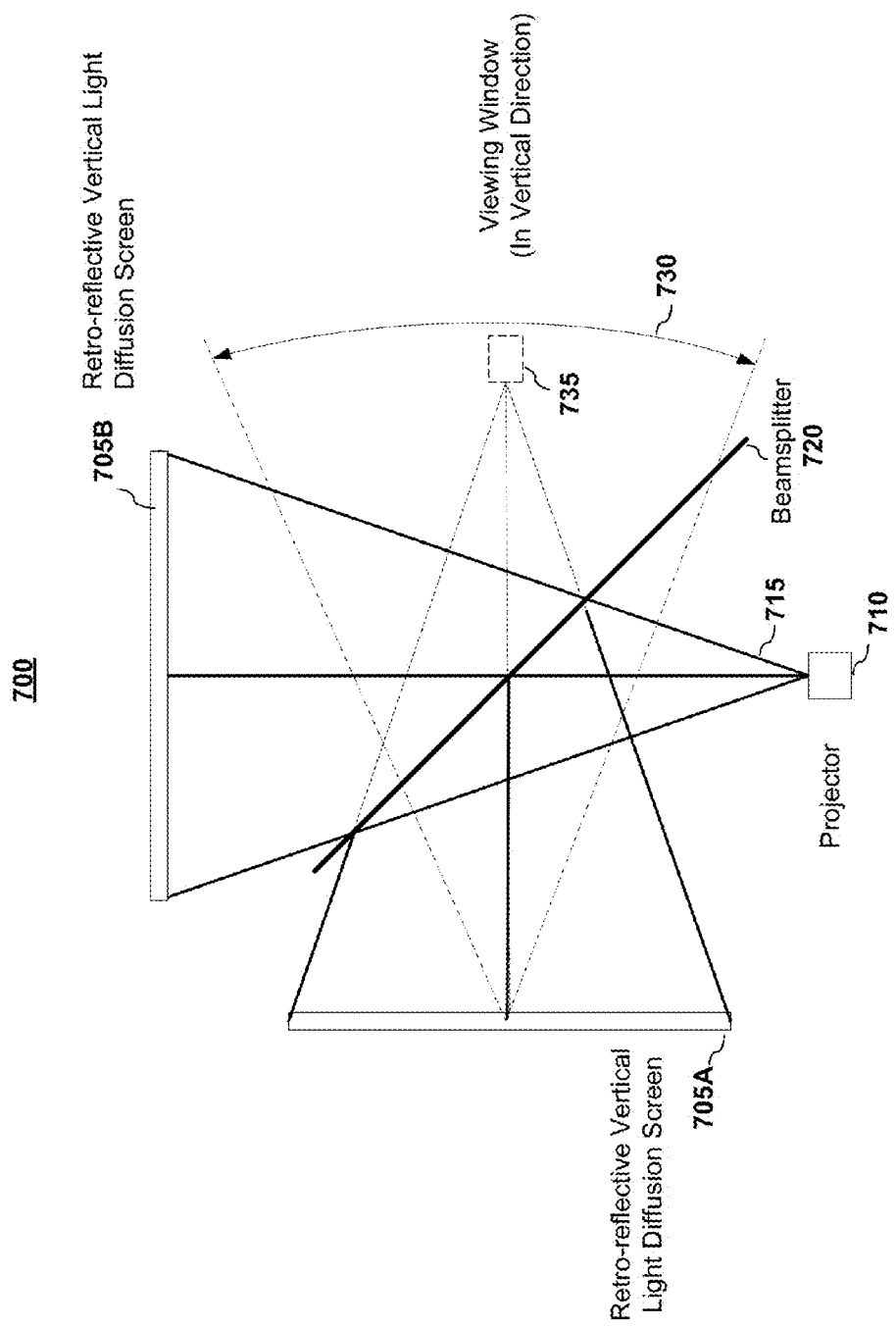
FIG. 7 illustrates another embodiment of a display system with at least one retro-reflective vertical light diffusion screen according to various embodiments of the invention.

Although the embodiment depicted in FIG. 6 creates a more compact design, the resulting image in the viewing window may be perceived as being less bright due to the energy loss as part of the beamsplitting. FIG. 7 illustrates an alternative embodiment of a display system with two retro-reflective vertical light diffusion screens according to various embodiments of the invention to address this light-loss issue.

FIG. 7 depicts a similar configuration 700 as the display system 600 shown in FIG. 6. The depicted display system 700 comprises a retro-reflective vertical light diffusion screen 705A and a projector 710 in the same or similar configuration as the system 600 illustrated in FIG. 6. As noted above, one issue of the display system 600 in FIG. 6 is that approximately half the energy is lost when the light passes through the beamsplitter each time. Thus, approximately 25% of the light actually reaches the user viewing window 630. One solution to this problem is to place a secondary retro-reflective vertical light diffusion screen 705B at a position optically mirror-conjugated with the original screen 705B. This causes the light reflected from the secondary retro-reflective vertical light diffusion screen 705B to add with the light reflected from the primary retro-reflective vertical light diffusion screen 705A that forms the viewing window 730. Thus, using the display system 700 depicted in FIG. 7 can increase the image brightness by a factor of 2 over the display system 600 depicted in FIG. 6.

4. Polarization Managed Display System Embodiments

Figure 8:
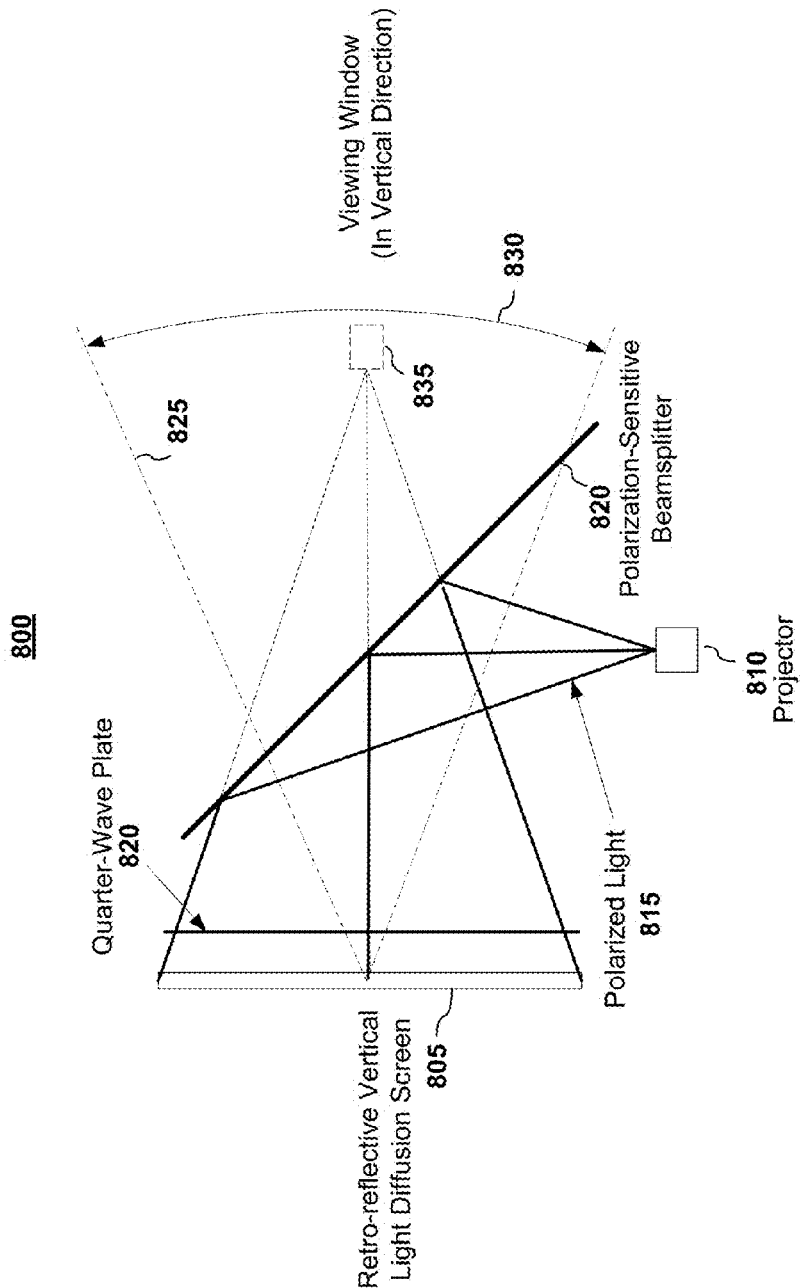
FIG. 8 illustrates yet another embodiment of a display system with a retro-reflective vertical light diffusion screen according to various embodiments of the invention.

FIG. 8 illustrates yet another embodiment of a display system with a retro-reflective vertical light diffusion screen according to various embodiments of the invention. The display system 800 illustrated in FIG. 8 is not only an alternative display system but also provides another solution to the energy loss issue noted with respect the system 600 illustrated in FIG. 6.

FIG. 8 depicts a configuration 800 that is similar to the configuration of the display system 600 shown in FIG. 6. The depicted display system 800 comprises a retro-reflective vertical light diffusion screen 805 and a projector 810 in the same or similar configuration as the system 600 illustrated in FIG. 6. However, as illustrated in FIG. 8, a polarization-sensitive beamsplitter 820 is used. Such a beamsplitter has near 100% reflection rate for polarized light when the light polarization direction matches with the polarization direction of the beamsplitter and near 100% transmissivity if the light polarization direction is orthogonal to the polarization direction of the beamsplitter. Thus, after the light 815 is reflected toward the screen 805, a quarter-wave plate 840 is used to rotate the light 45°. When the light is reflected from the screen 805, it is rotated another 45° when it again passes through quarter-wave plate 840. The polarization of the resulting light is orthogonal to the polarization of the light 815 and will pass through the polarization-sensitive beamsplitter 820. Thus, near 100% of the light reaches the user space in the viewing window 830. This approach can increase the image brightness in the viewing window 830 by a factor of 4 over the configuration depicted in FIG. 6.

It shall be noted that the configurations shown in FIGS. 6-8 were depicted with a single projector to simply the explanation. One skilled in the art shall recognize that additional projectors can be added to any of the disclosed systems.

5. Additional Layer Embodiments a) Transparent Layer Embodiments

When an image is projected onto a retro-reflective surface, the vast majority of the light is retro-reflected back to the image source. However, because retro-reflectors are not perfect, some light is diffused or reflected in other directions. This diffused or errantly reflected light can create unwanted images, known as ghost images.

An anti-reflection coating on the reflection surface would reduce the ghost images from the diffusion. However, this solution can be very expensive. As an alternative solution, presented herein is a transparent medium gap between the diffusor and the retro-reflective material. The transparent space allows the ghost image to blur on the retro-reflective material, while keeping the image on the diffuser sharp because of the focusing ability of the retro-reflective material. Furthermore, the front diffusor layer diffuses the already blurred ghost image, which further dims the ghost image. As a result, a user will see a darker and blurred ghost image, if at all.

As discussed above, when the light diffusion material is placed in front of the retro-reflective material, light is reflected back along the incident direction by the retro-reflective layer and is diffused into a fan shape by the light diffusing material. The resulting reflected light rays create a viewing window. Each viewing window displays an image of a projector. Accordingly, multi-projectors combined with the retro-reflective light diffusion screen can produce multiple viewing windows. If those windows display images from different perspectives, the multi-projector and screen system forms a three-dimensional display system. That is, by using the projectors to display a set of images captured from multiple perspectives, a user can see a three-dimensional image via the viewing windows that are formed. However, if there is imperfection in the screen, ghost images may be formed.

In embodiments of the light diffuser and retro-reflective screen system as discussed above, an image is focused on the diffuser and the retro-reflective material. Both the retro-reflected image on the diffuser and the ghost image on the retro-reflective material are sharp. The diffused or misdirected light of the ghost image is in focus. If the ghost image is sufficiently bright, it can be seen in viewing windows and would interfere with a user's ability to perceive the proper image for that view window. When the ghost image is significant, the user may not be able to perceive a stereo view.

In embodiments, to reduce the effects of ghost images, a third layer is introduced between the retro-reflective material and the light shaping diffuser. This layer allows the diffused light to further diffuse, which causes it to be dimmed and significantly blurred while still allowing the retro-reflected image to remain sharp.

Figure 9:
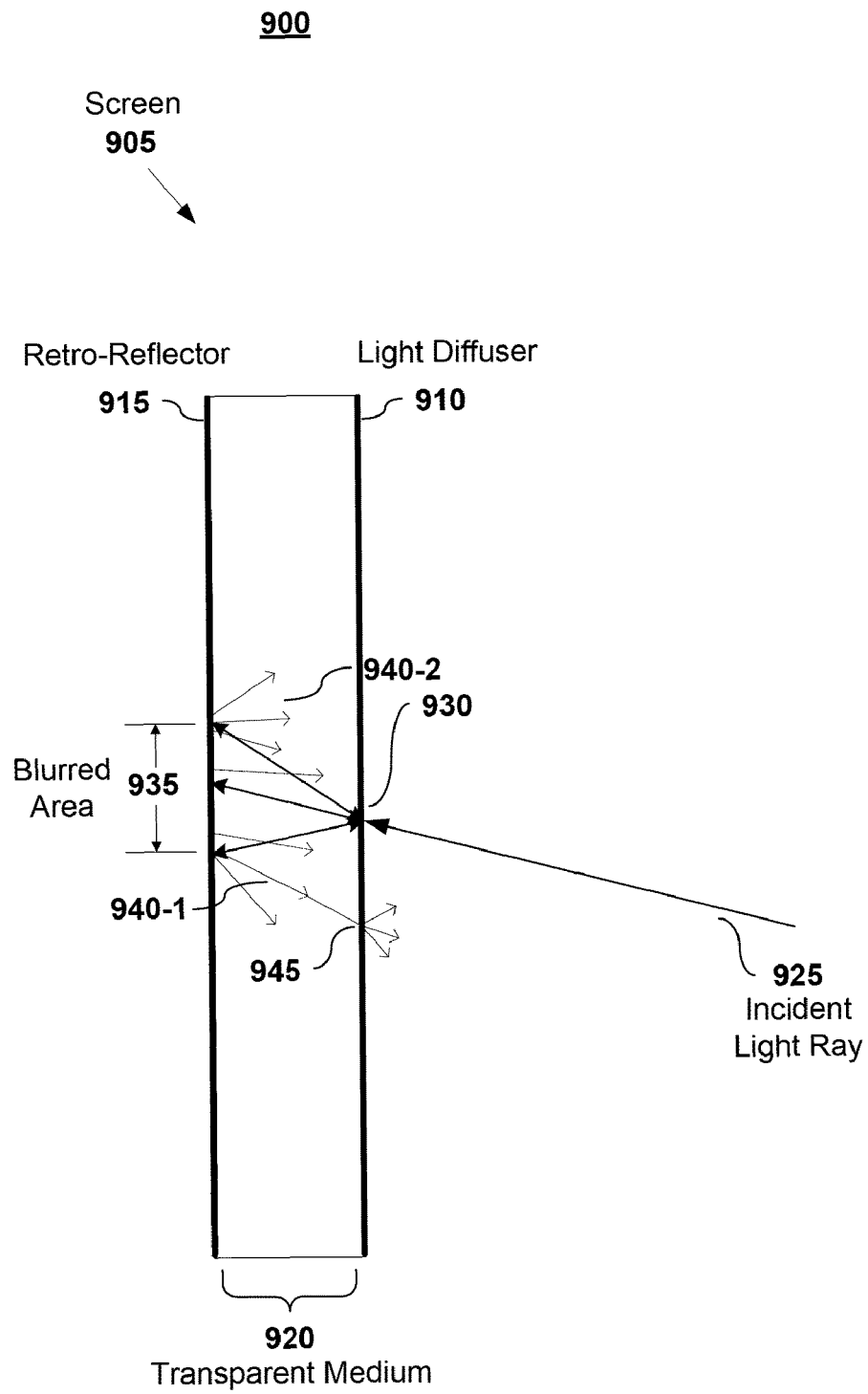
FIG. 9 illustrates another embodiment of a retro-reflective light diffusion screen according to various embodiments of the invention.

FIG. 9 illustrates an embodiment of a three-layer retro-reflective light diffusion screen 905 according to various embodiments of the invention. The screen depicted in FIG. 9 comprises a light diffuser 910 and a retro-reflector 915, which are separated by a transparent medium 920. In embodiments, the width of the transparent gap was between 10-30 millimeters, although other widths values may be used. The transparent medium may be, by way of example and not limitation, glass, plastic, a vacuum or nearly vacuum space, or transparent (or substantially transparent) gas or gases.

In a projector system, the projector is focused on the first layer—the diffuser 910. Therefore, the image on the diffuser is sharp. However, the image on the retro-reflective material 915 is significantly blurred because space exists due to the transparent medium 920 for the image to diffuse before reaching the retro-reflector 915. As illustrated in FIG. 9, an image point 930 on the diffuser 910 is a blurred area 935 on the retro-reflector 915. Therefore, the image on the retro-reflector is blurred.

Although most of the light will be properly retro-reflected, some light rays (e.g., 940-$x$) are imperfectly reflected or diffused and travel in various directions. These light rays will be further diffused when passing through the diffuser 910. Therefore, the ghost images will be additionally blurred and darkened after passing through the diffuser 910. For example, light ray 940-1 travels through diffuser 910 and is further diffused by the diffuser 910 to create even more dispersed, and therefore dimmer, light rays 945.

Figure 10:
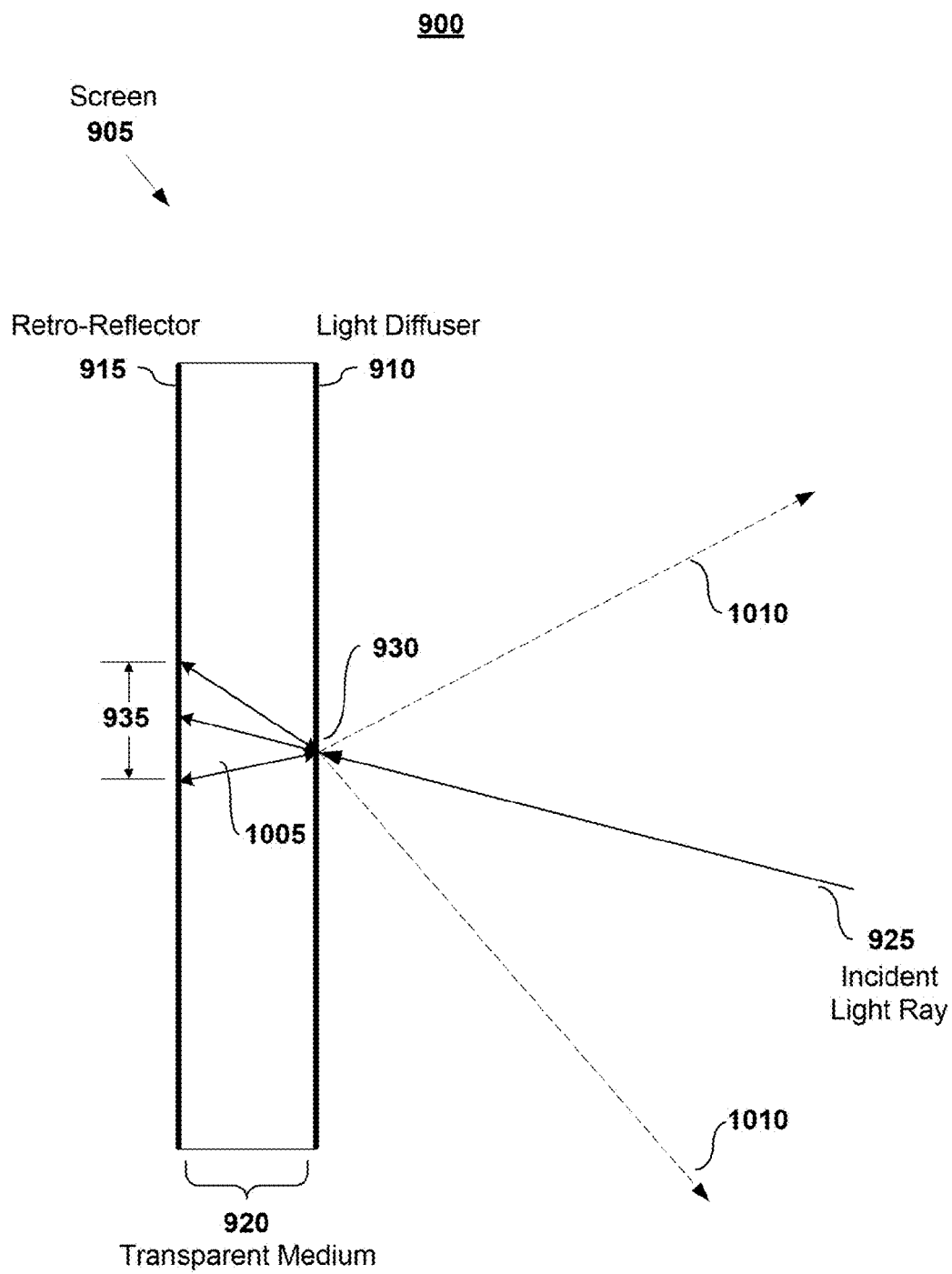
FIG. 10 illustrates the retro-reflective light diffusion screen of FIG. 9 according to various embodiments of the invention.

FIG. 10 illustrates the triple-layer retro-reflective light diffusion screen of FIG. 9 for the retro-reflective light according to various embodiments of the invention. Most of the light incident on the retro-reflector 915 will be retro-reflected back 1005. Thus, even though the image on the retro-reflector 915 is blurred, the retro-reflected light rays are focused 930 on the light diffuser 910 due to the retro-reflective property of the retro-reflector 915. Therefore, the retro-reflective image remains sharp despite the introduction of the gap formed by the transparent medium 920.

Since the image is focused on the light diffuser 910, after the image is properly diffused by the diffuser 910 and forms a view window 1010 by being diffused vertically but only diffused slightly in the horizontal direction, in the view window 1010, a user will see a sharp image. And, the user will see less, if any, of the greatly diffused ghost images.

It shall be noted that the triple layer screen embodiments may also be utilized in the embodiments discussed above with respect to the dual layer screen.

b) Lenticular Layer Embodiments

A lenticular sheet contains many cylindrical lens (one-dimensional lens) arranged side-by-side. Since the lenses are one dimensional, a lenticular sheet has focusing ability in only one direction. Lenticular sheets have been used in both transparent-type and reflection-type three-dimensional displays. For example, a lenticular reflection screen (LRS) contains two layers: a lenticular sheet and a regular diffusion surface. In the vertical direction, the light is diffused in all the directions, and in the horizontal direction, the light is first diffused and then refocused back to the projector by the one-dimensional lenses.

Figure 11:
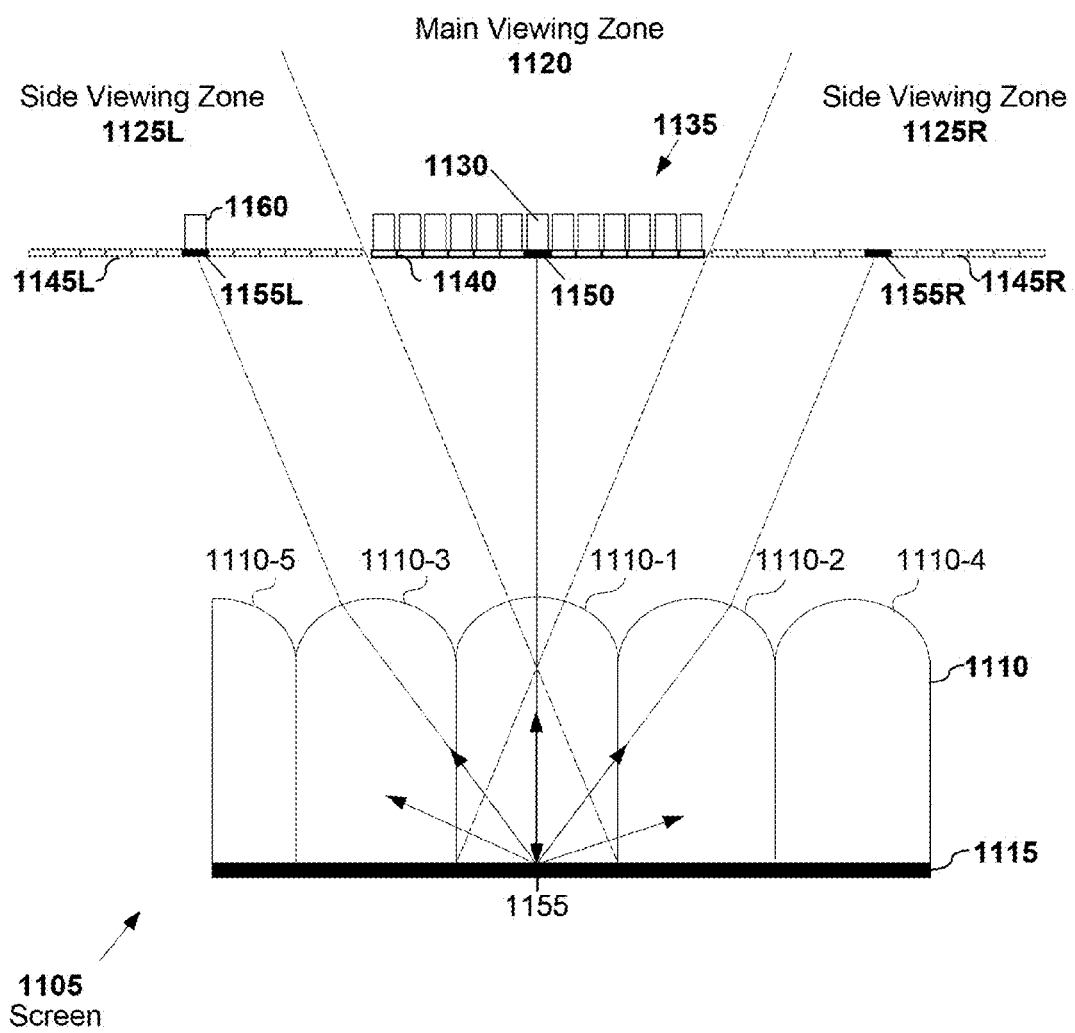
FIG. 11 illustrates an example of a lenticular reflection screen.

Although lenticular reflection screens have been used in three-dimensional displays, lenticular reflection screens have significant limitations. When projecting images on a lenticular reflection screen, a set of projector form not only a main viewing zone but also side viewing zones, similar to a transparent-type configuration projection system. If additional projectors are placed outside of the main viewing zone in a side viewing zone, crosstalk between the projected images can occur, which limits the field of view of the lenticular sheet system. FIG. 11 illustrates an example such of a lenticular reflection screen configuration.

FIG. 11 illustrates the formation of viewing zones from a lenticular reflection screen system 1100 and the crosstalk that can exist in such system. The lenticular reflection screen system in FIG. 11 includes a typical lenticular reflection screen 1105 and a set of projector 1135. The lenticular reflection screen 1105 is a lenticular sheet 1110 and a regular diffusion surface 1115. The lenticular sheet 1110 is formed from a plurality of parallel, one-dimensional lenses 1110-x. The set of projectors 1135 project images, such as a multi-view image set, onto the screen 1105. Light from the projector set 1135 form a corresponding main viewing zone 1120, containing multiple viewing windows 1140. The number of viewing windows 1140 formed within the main viewing zone 1120 is the same as the number of the projectors placed within the main viewing zone 1120. The number of projectors that can be placed within the main viewing zone is related to the width of the viewing window, the distance from the projectors to the screen, and the field of view of the lenticular lens. In addition to the main viewing zone 1120, several side viewing zones with corresponding sets of viewing windows (e.g., 1145L and 1145R) are also formed as a result of the large diffusion angle of using a regular diffuser 1115 in the lenticular reflection screen 1105.

As illustrated in FIG. 11, the light from the projector 1130 is imaged at point 1155 through lens 1110-1. The light is returned and forms a view window 1150 in the set of viewing windows 1140 in the main viewing zone 1120. Due to large diffusion angle of the regular diffuser surface 1115, the diffused light at point 1155 reaches not only the lens 1110-1, but also neighboring lenses (e.g., 1110-2, 1110-3, 1110-4, 1110-5, and so on). As a result, in addition to the viewing windows 1140 formed in main viewing zone 1120, multiple viewing windows (e.g., 1155L and 1155R) are formed in side viewing zones (e.g., 1125L and 1125R, respectively)—one in each side viewing zones. To simply the figure, only two viewing windows (1155L and 1155R) in two side viewing zones (1125L and 1125R) are showed.

When multiple projectors 1135 are used to form multiple viewing windows 1140 in the main viewing zone 1120, in each side viewing zone a corresponding set of the viewing windows (e.g., a set of viewing windows 1145L in side viewing zone 1125L and a set of viewing windows 1145R in side viewing zone 1125R) are also formed.

If another projector 1160 is placed inside a side viewing zone 1125L to project images onto the screen 1105, light from the projector 1160 forms a corresponding main viewing window in side viewing zone 1125L and side viewing windows in main viewing zone 1120 and side viewing zone 1125R, and these viewing windows could overlap with the viewing windows formed by the set of projectors 1135. For example, the light from the projector 1160 in the side viewing zone 1125L may interfere with light from the projector 1130 in the set of projectors 1135 in the main viewing zone 1120. Accordingly, crosstalk between the reflected images exists. If the crosstalk is significant, it can impede the ability of a user to perceive stereo images.

Figure 12:
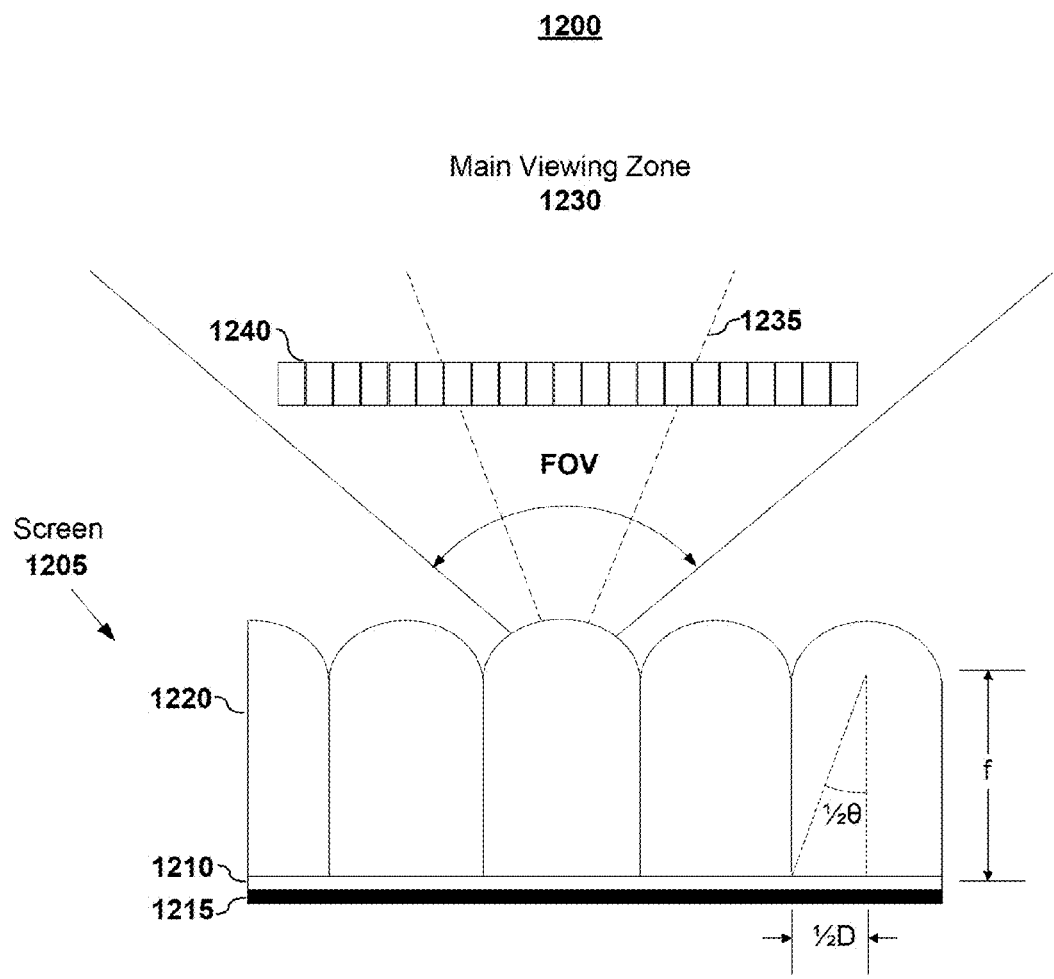
FIG. 12 illustrates another embodiment of a retro-reflective light diffusion screen with a lenticular layer according to various embodiments of the invention.

Because a projector or set of projectors cannot placed outside of the main viewing zone of a main projector set without creating crosstalk issues, a typical LRS-based system can be very limited because its field of view for the main view area is limited. FIG. 12 illustrates an embodiment of a retro-reflective light diffusion screen with a lenticular layer according to various embodiments of the invention that extends the main viewing zone.

Depicted in FIG. 12 is a retro-reflective light diffusion screen 1205, which comprises a lenticular layer 1220, a light diffuser 1210, and a retro-reflector 1215. In embodiments, a screen 1205 may be formed by combining a lenticular layer 1220 with the dual layer retro-reflective light diffusing screen described previously. The lenticular layer 1220 is configured such that the light diffuser is at the focus plane, f, of the cylindrical lenses of the lenticular layer. Incident light that traveled through the lenticular lens and the light diffuser is reflected back in the direction of the incident light by the retro-reflective material 1215. The light diffuser 1210 diffuses the retro-reflected light in a large angle in the vertical direction but only by a small angle in the horizontal direction. A tighter horizontal diffusion angle allows the light to travel back to only one lens, therefore, only forms a larger main field of view and no side viewing zone. As a result, the main view area 1230 is larger than a typical LRS's main viewing zone 1235.

Such a screen 1205 as the one depicted in FIG. 12 has several advantages. First, the screen 1205 eliminates the side viewing zones, and therefore, reduces crosstalk. Second, the screen 1205 has an increased overall field of view and extended main viewing zone. As shown in FIG. 12, the three component screen 1205 has a larger main viewing zone 1230 as compared to the main viewing zone 1235 of a regular lenticular screen, such as the screen 1105 in FIG. 11. And finally, the screen 1205 can produce an increased brightness because of the added focus from the lenticular layer.

Figure 13:
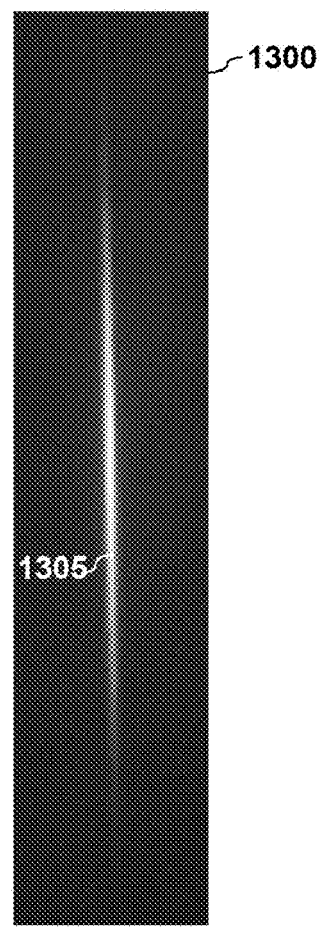
FIG. 13 depicts the light distribution of a view window from an embodiment of a retro-reflective light diffusion screen according to various embodiments of the invention.
Figure 14:
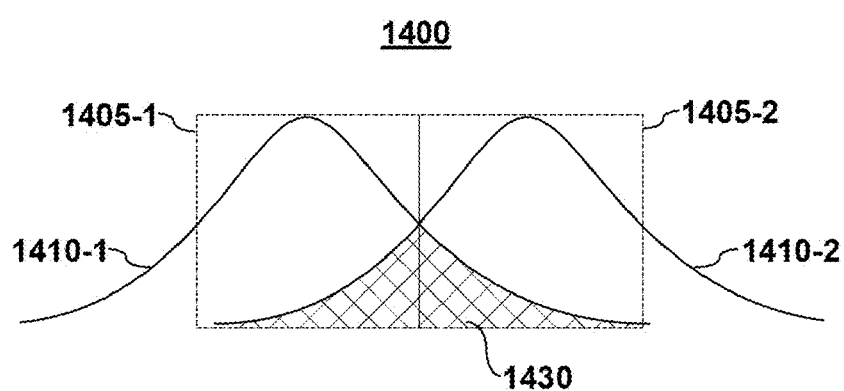
FIG. 14 depicts the cross-section of two adjacent view windows from an embodiment of a retro-reflective light diffusion screen according to various embodiments of the invention.

In addition to the reducing the crosstalk issue related to side viewing zones, the retro-reflective light diffusion screen with the lenticular layer addresses another crosstalk problem due to the diffusion profile of the diffuser. FIG. 13 depicts the light distribution of a view window from an embodiment of a retro-reflective light diffusion screen according to various embodiments of the invention. As depicted in the FIG. 13, the light distribution 1305 of the diffused light follows a Gaussian distribution. As best seen in the vertically direction, the light is brightest at the center and fades in brightness toward the top and bottom. The diffused light 1305 also has a Gaussian distribution in the horizontal direction as well. FIG. 14 depicts examples of a cross-section of the diffused light 1305.

FIG. 14 depicts the cross-section of two adjacent view windows 1405-1 and 1405-2 from an embodiment of a retro-reflective light diffusion screen according to various embodiments of the invention. As depicted in FIG. 14, the two adjacent view windows 1405-1 and 1405-2 are formed from two diffused light regions 1410-1 and 1410-2 from a retro-reflective light diffusion screen. The light regions 1410-1 and 1410-2 follow a Gaussian distribution, and because the light passes through the light diffuser twice, the diffusion angle is approximately the square root of 2 times larger than the diffusion angle of the light shaping diffuser.

Because the light follows a Gaussian distribution, there is no well defined energy cutoff boundary. In embodiments, the view window may be defined as the region at which the intensity of the light is above a threshold value or percentage, such as, by way of example and not limitation, 50% of the maximum. Because of the distribution, some energy may leak to the neighbor viewing windows as depicted in FIG. 14

(region 1430). By adding a lenticular lens layer to a retro-reflective light diffusion screen, the lenticular layer focuses the diffused light and creates a more tightly distributed light region. The more tightly distributed light profiles create viewing windows with more well defined boundaries and reduces or eliminates crosstalk due to energy leakage. For a retro-reflective light diffusion screen with a very small horizontal diffusion angle, a lenticular layer may not provide significant advantage. However, if the view windows formed by the screen exhibit significant crosstalk, the addition of a lenticular layer can help minimize the crosstalk.

It shall be noted that the retro-reflective light diffusion screen with a lenticular layer may also be utilized in the embodiments discussed above with respect to the dual layer screen.

c) Lenticular Layer and Transparent Layer Embodiments

Figure 15:
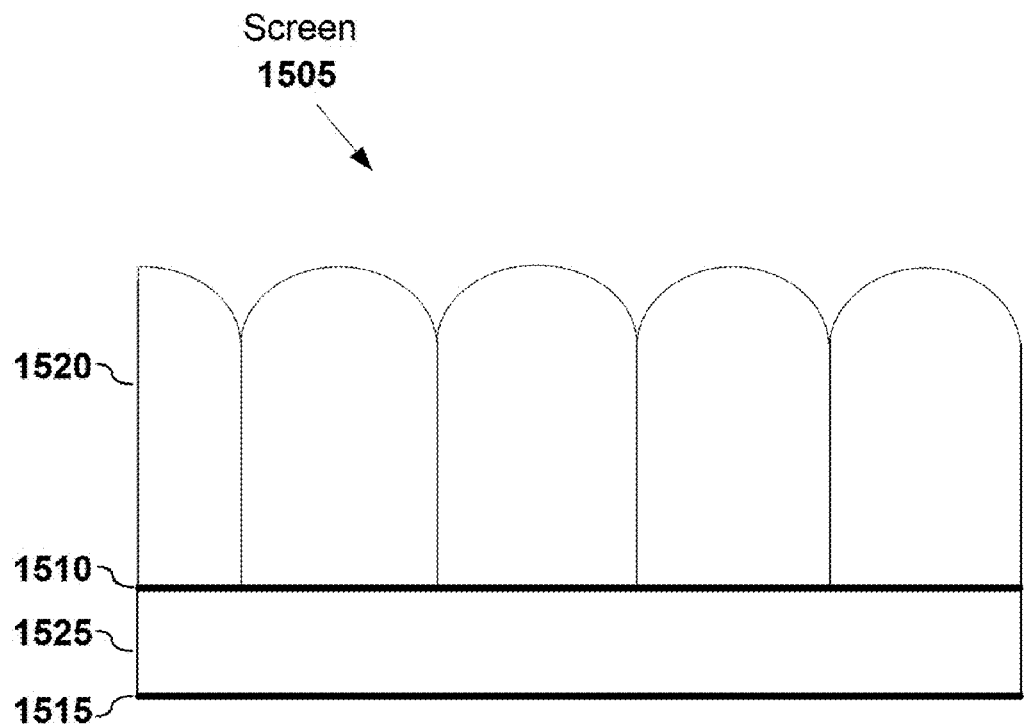
FIG. 15 illustrates yet another embodiment of a retro-reflective light diffusion screen according to various embodiments of the invention.

FIG. 15 illustrates yet another embodiment of a retro-reflective vertical light diffusion screen according to various embodiments of the invention. Depicted in FIG. 15 is a retro-reflective light diffusion screen 1505, which comprises a lenticular layer 1520, a transparent medium layer 1525, a light diffuser 1510, and a retro-reflector 1515. Such a configuration can have the benefits of reducing ghost images and reduce crosstalk. It shall be noted that such a screen may be also be utilized in the embodiments discussed above with respect to the dual layer screen.

E. Aerial Three-Dimensional Image Displays

Aspects of the present invention include embodiments that produce aerial displays of images; that is, images that appear to be floating or suspended in the air. The images may be still images or video images. Embodiments of an aerial three-dimensional display include a multi-view-window-based display and one or more optical focusing elements to focus the light from the multi-view-window-based display to a different location.

1. Viewing Window Aerial Three-Dimensional Image Displays

Figure 16:
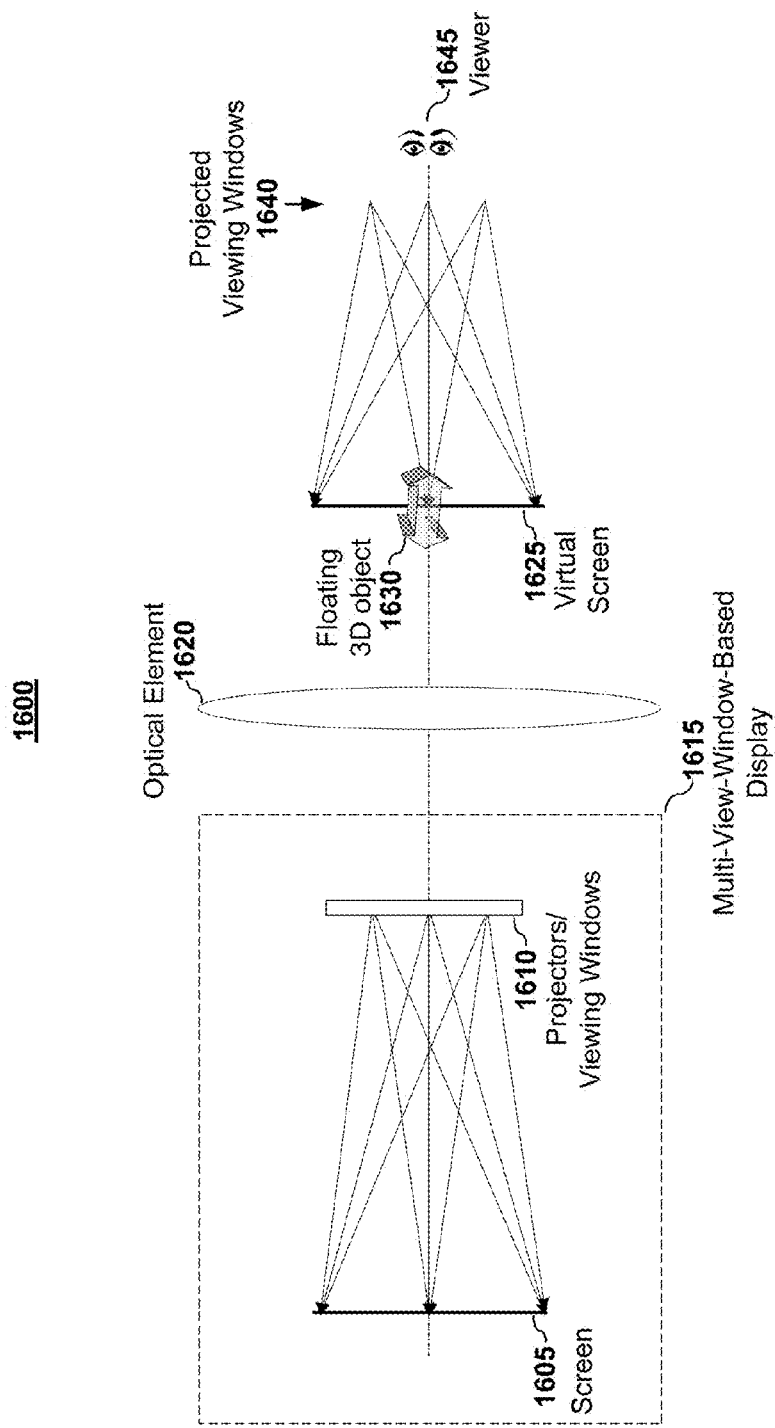
FIG. 16 illustrates an embodiment of an aerial three-dimensional image display system according to various embodiments of the invention.

Consider, by way of illustration and not limitation, the embodiment depicted in FIG. 16. FIG. 16 depicts an aerial three-dimensional image display system according to various embodiments of the invention. As shown in FIG. 16, the display system 1600 comprises a multi-view-window-based display system 1615 and an optical focusing element 1620. The multi-view-window-based display system 1615 of the aerial three-dimensional image display system may be any multi-view-window-based display system. In embodiments, the multi-view-window-based display system 1615 may utilize any of the embodiments of the retro-reflective light diffusion screen display systems described above. For example, the screen 1605 in the multi-view-window-based display system 1615 may be any of the retro-reflective diffusion screens discussed previously. The imaging element 1620 may be a regular lens, a Fresnel lens, a concave mirror, or combination of these which act as an imaging lens.

The optical focusing element 1620 is positioned relative to the multi-view-window-based display system 1615 such that the multi-view windows 1610 of the display 1615 are focused by the optical element 1620 to another location to form projected viewing windows 1640. A viewer 1645 properly positioned to view the projected viewing windows 1640 will see a three-dimensional object 1630. Since the displayed image 1630 appears to be presented as on a virtual screen 1625, the three-dimensional image 1630 will appear as if floating in air.

Figure 17:
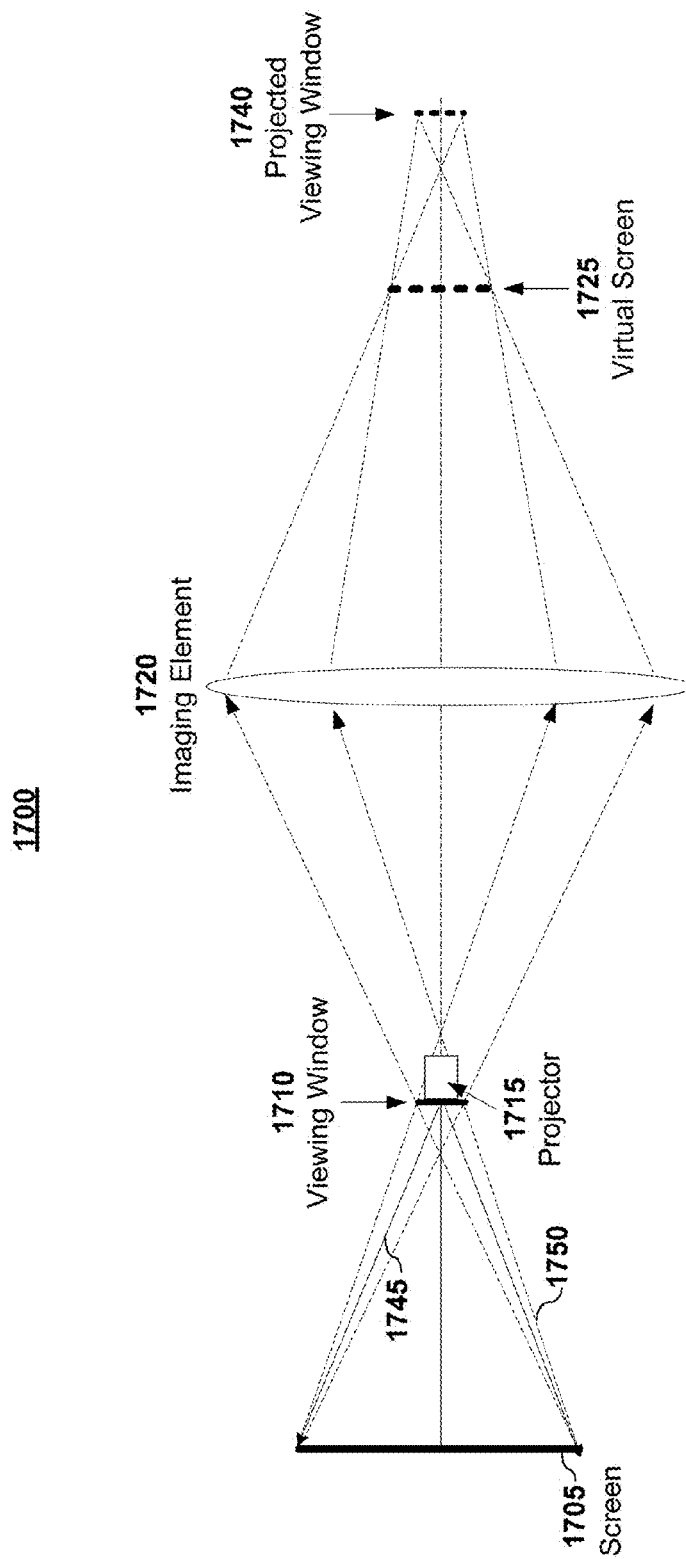
FIG. 17 illustrates ray tracing of an embodiment of an aerial three-dimensional image display system according to various embodiments of the invention.

FIG. 17 illustrates ray tracing of an embodiment of an aerial three-dimensional image display system according to various embodiments of the invention. To simply the ray tracing, only a single projector 1715 and corresponding viewing window 1710 of a multi-viewing-window and its emitted light are shown.

As shown in FIG. 17, the projector 1715 projects images or videos on the screen 1705. The rays (e.g., 1745) from the projector 1715 are retro-reflected back to the projector and diffused with a small diffusion angle by the screen 1705. As a result, a viewing window 1710 is formed at the projection point of the projector 1715. The reflected rays (e.g., 1750) continue to propagate and pass the projector, and are focused by the imaging element 1720 to form a virtual screen 1725 and a projected viewing window 1740 in three-dimensional space at the other side of the imaging element 1720. The virtual screen 1725 is optically conjugate with the physical screen 1705 and the projected viewing window 1740 is optically conjugate with the viewing window 1710 at the projection point. By adding more projectors, more viewing windows, as well as their images (projected viewing windows) are formed. If a viewer observes the virtual screen 1725 through these projected viewing windows, he/she sees three-dimensional images (still images or video images) floating in air.

Figure 18:
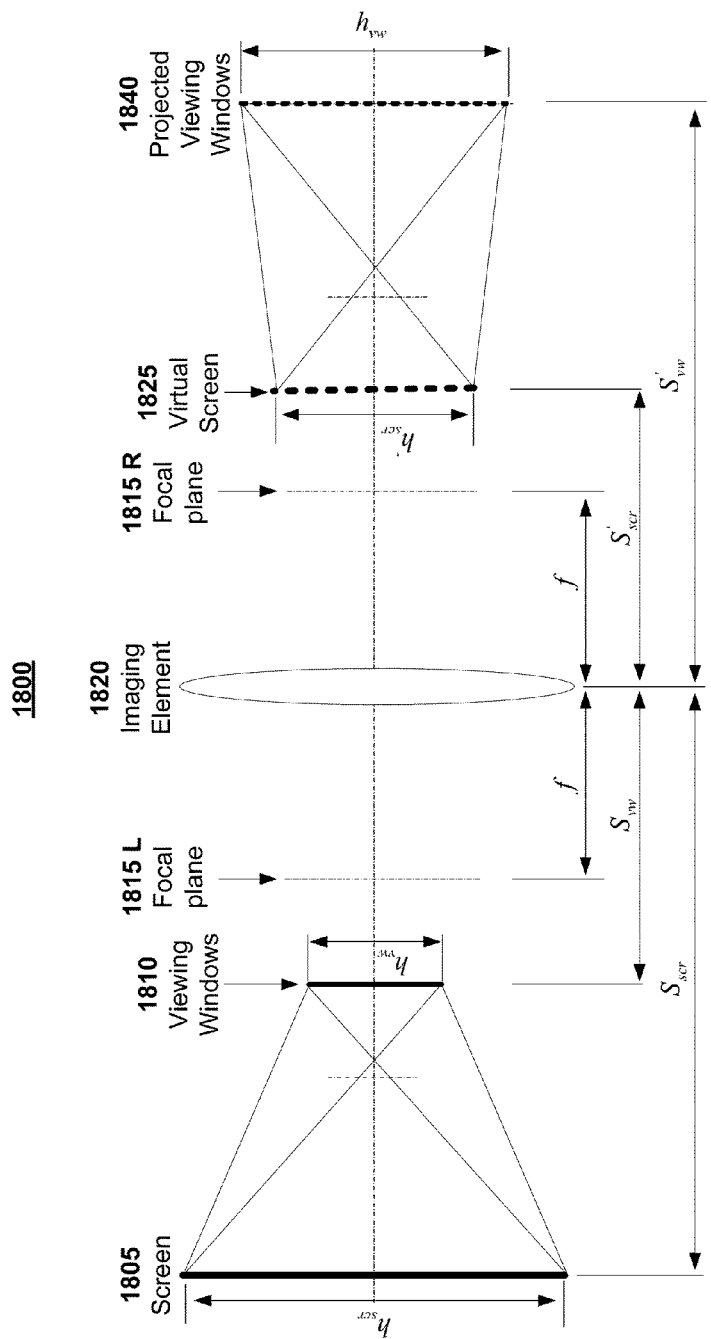
FIG. 18 illustrates the position and sizing of the virtual screen and the projected viewing windows of an aerial three-dimensional image display system according to various embodiments of the invention.

FIG. 18 illustrates the position and size of the virtual screen and the projected viewing windows of an aerial three-dimensional image display system according to various embodiments of the invention. In embodiments, the size, $h'_{scr}$, of the virtual screen 1825 depends on the size, $h_{scr}$, of the physical screen 1805 and the screen position, $S_{scr}$, relative to the imaging lens 1820, as well as the focal length, f, of the imaging element 1820. The size, $h'_{vw}$, of the projected viewing windows 1840 depends on the size, $h_{vw}$, of the viewing windows 1810 at the projection point and the relative position, $S_{vw}$, of the viewing windows 1810 to the imaging lens 1820, as well as the focal length, f, of the optical element 1820.

The relation of the screen 1805 and the virtual screen 1825 is governed by the lens law. The position and size of the virtual screen 1825 can be expressed according to the following equations:

$$\text{Position:} \quad S'_{scr} = \frac{S_{scr} \cdot f}{S_{scr} - f}$$

$$\text{Size:} \quad h'_{scr} = \frac{h_{scr} \cdot f}{S_{scr} - f}$$

Similarly, the relation of the viewing windows 1810 and the projected viewing windows 1840 is also governed by the lens law.

$$\text{Position:} \quad S'_{vw} = \frac{S_{vw} \cdot f}{S_{vw} - f}$$

$$\text{Size:} \quad h'_{vw} = \frac{h_{vw} \cdot f}{S_{vw} - f}$$

As shown in FIG. 18, the optical element 1820 is positioned relative to the multi-view-window-based display system such that the multi-view-window-based display system is at a distance that is beyond the focal length, f (e.g., 1815L), of the lens 1820.

Figure 19:
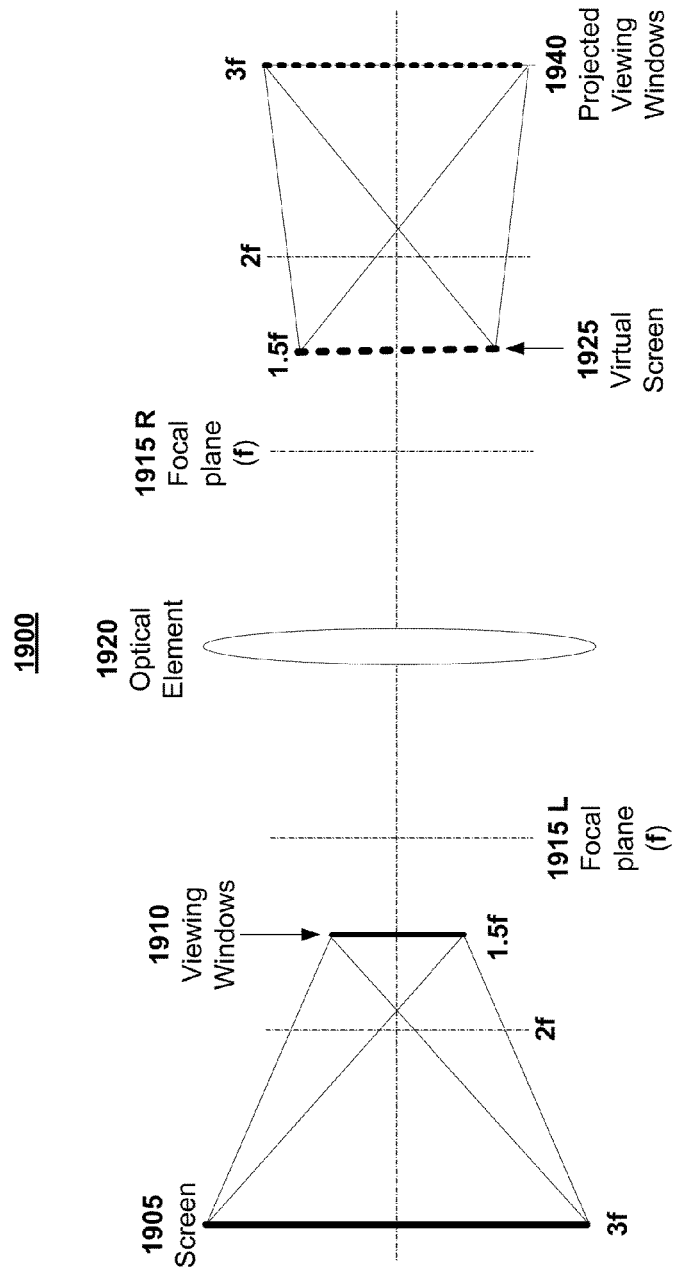
FIG. 19 illustrates an aerial three-dimensional image display system according to various embodiments of the invention.

FIG. 19 illustrates an example of an aerial three-dimensional image display system according to various embodiments of the invention. As shown in FIG. 19, the distance from the screen 1905 to the optical focusing element 1920 is 3 times of the focal length, f, of the imaging lens 1920. The distance from the viewing windows 1910 to the lens is 1.5 times of the focal length, f, of the imaging element 1920. The virtual screen 1925 is located at 1.5 f image plane, and the size is 2 times smaller than the size of the physical screen 1905. The projected viewing windows 1940 are located at 3 f image plane, and the sizes are 2 times bigger than the sizes of the viewing windows 1910. One skilled in the art shall recognize that other configuration can be employed.

Figure 20:
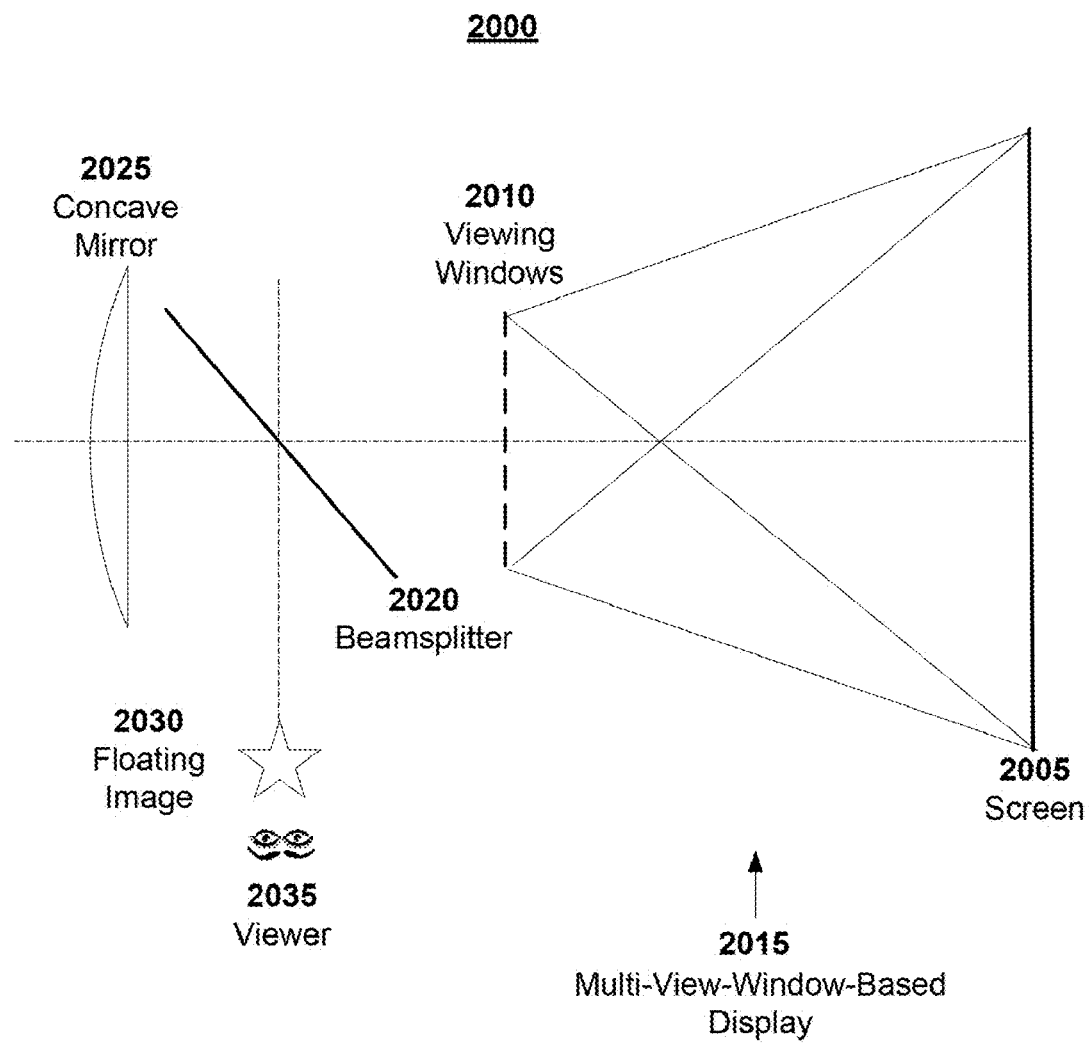
FIG. 20 illustrates another embodiment of an aerial three-dimensional image display system according to various embodiments of the invention.

FIG. 20 illustrates another embodiment of an aerial three-dimensional image display system according to various embodiments of the invention. The embodiment depicted in FIG. 20 comprises a multi-view-window-based display 2015 that includes a screen 2005 and projectors (not shown) that generate viewing windows 2010. The system 2000 also includes a beamsplitter 2020 and a concave mirror 2025, which may be a parabolic mirror or a spherical mirror. In embodiments, the beamsplitter 2020 allows light to pass through from the multi-view-window-based display 2015 to the concave mirror 2025, which reflects and causes the light to be focused. The beamsplitter 2020 receives the reflected light from the concave mirror and further reflects it. Because the concave mirror 2025 causes the light to be focused, the light reflected from the concave mirror 2025 and the beamsplitter 2020 will generate projected viewing windows and will allow a viewer 2035 positioned at the projected viewing windows to see a floating image or images 2030. In embodiments, the beamsplitter 2020 may be partially reflective, which will allow the viewer 2035 to see objects located at the other side of the beamsplitter opposite the viewer. Such a configuration may be advantageous for combining floating image display with other displays or presentation materials.

Figure 21:
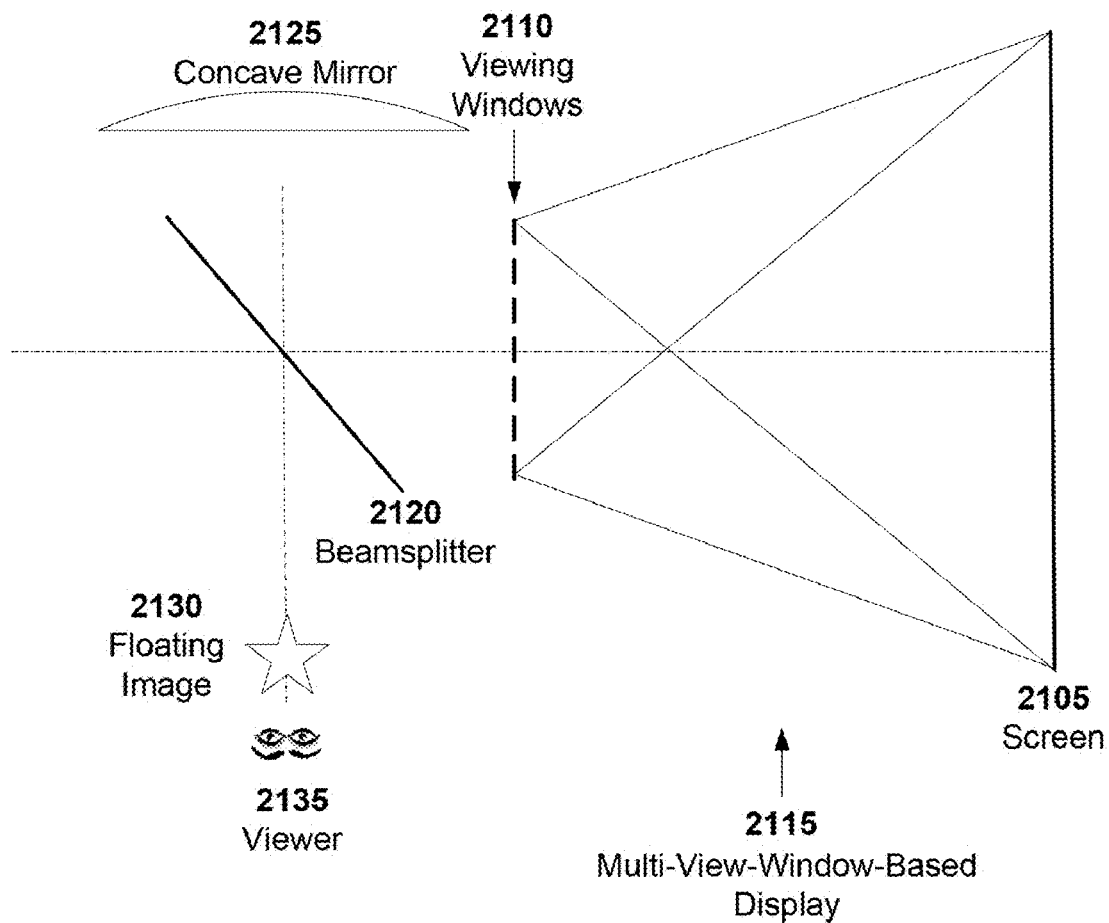
FIG. 21 illustrates yet another embodiment of an aerial three-dimensional image display system according to various embodiments of the invention.

FIG. 21 illustrates yet another embodiment of an aerial three-dimensional image display system according to various embodiments of the invention. The embodiment depicted in FIG. 21 comprises a multi-view-window-based display 2115 that includes a screen 2105 and projectors (not shown) that generate viewing windows 2110. Like the system 2000 depicted in FIG. 20, the system 2100 also includes a beamsplitter 2120 and a concave mirror 2125, which may be a parabolic mirror or a spherical mirror. Note, however, that unlike the system in FIG. 20, the present system 2100 has the beamsplitter 2120 and the concave mirror 2125 in a different configuration. In embodiments, the beamsplitter 2120 reflects the light from the multi-view-window-based display 2115 to the concave mirror 2125, which reflects and causes the light to be focused. The beamsplitter 2120 receives the reflected light from the concave mirror and allows at least a portion of the light to pass through to form view windows. Because the concave mirror 2125 causes the light from the multi-view-window-based display 2115 to be focused, the light reflected from the concave mirror 2125 and passing through the beamsplitter 2120 will generate projected viewing windows and will allow a viewer 2135 positioned at the projected viewing windows to see a floating image or images 2130. It should be noted that unlike the configuration 2000 depicted in FIG. 20, the configuration 2100 depicted in FIG. 21 will not allow the viewer 2135 to see objects located at the other side of the beamsplitter because of the mirror 2125. Such a configuration may be advantageous in limiting possible interference caused light or images that would be visible in the other configuration 2000.

Figure 22:
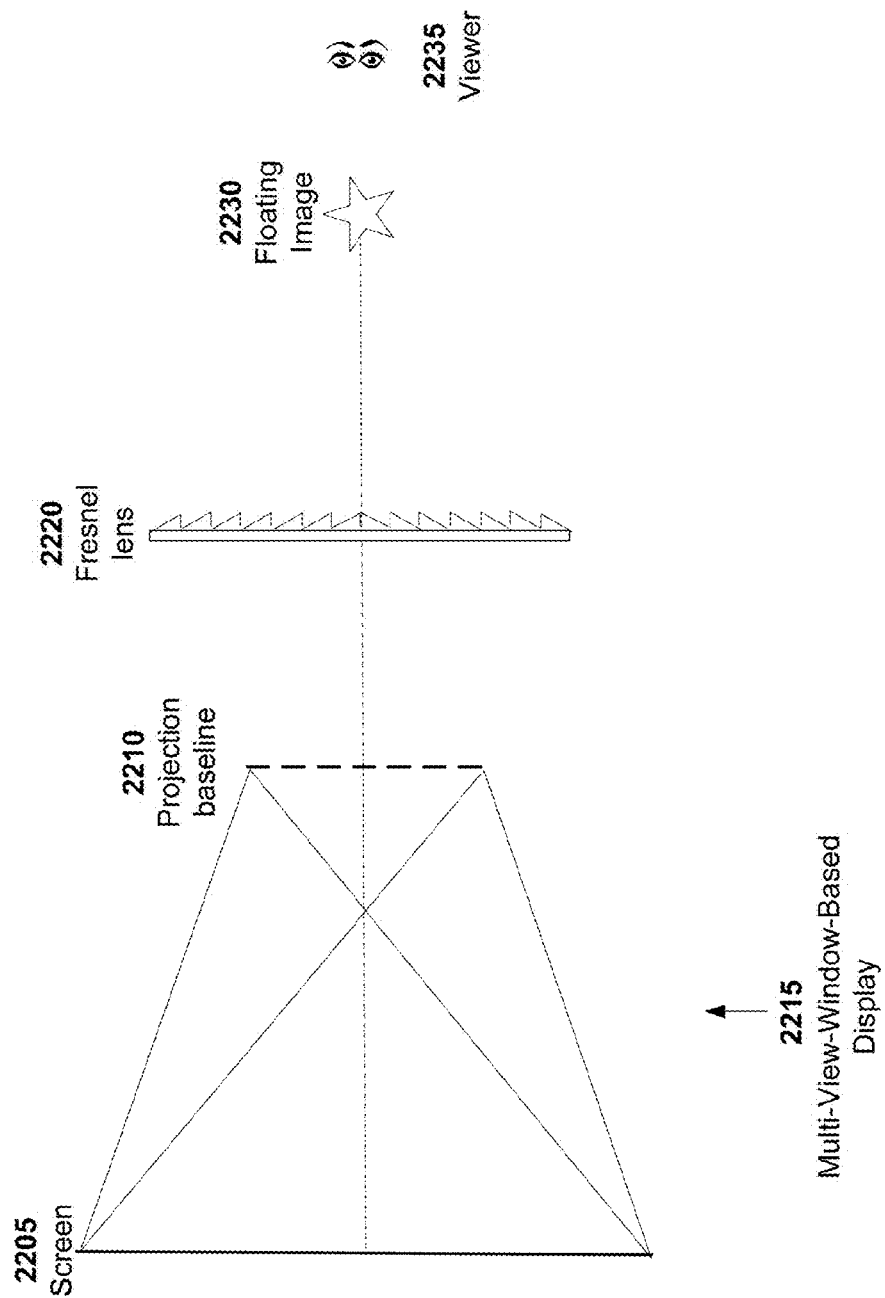
FIG. 22 illustrates another embodiment of an aerial three-dimensional image display system according to various embodiments of the invention.

FIG. 22 illustrates another embodiment of an aerial three-dimensional image display system according to various embodiments of the invention. The embodiment depicted in FIG. 22 comprises a multi-view-window-based display 2215 that includes a screen 2205 and projectors (not shown) that generate viewing windows 2210. The system 2200 also includes a Fresnel lens 2220 that causes the light to be focused to create the projected viewing windows. Thus, a viewer 2235 positioned at the projected viewing windows will see a floating image or images 2230. One skilled in the art shall recognize that the configuration depicted in FIG. 22 may also use mirrors to fold the optical path and/or could use a beamsplitter or beamsplitters to make system similar to those discussed previously.

2. Parallel Projected Viewing Windows Aerial Three-Dimensional Image Displays

Figure 23:
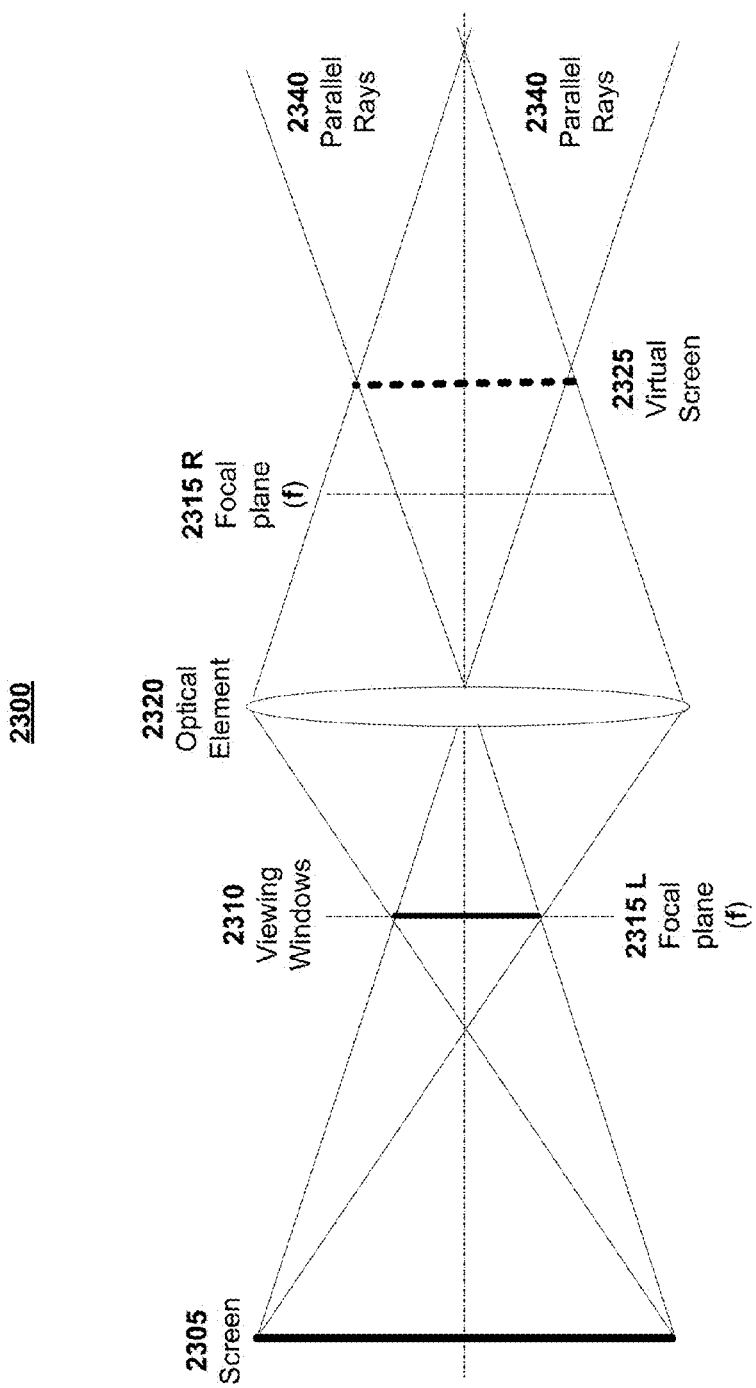
FIG. 23 illustrates another embodiment of an aerial three-dimensional image display system according to various embodiments of the invention.

Consider, by way of illustration and not limitation, the embodiment depicted in FIG. 23. FIG. 23 depicts an aerial three-dimensional image display system according to various embodiments of the invention. As shown in FIG. 23, the display system 2300 comprises a multi-view-window-based display system and an optical focusing element 2320. The multi-view-window-based display system of the aerial three-dimensional image display system may be any multi-view-window-based display system. In embodiments, the multi-view-window-based display system may utilize any of the embodiments of the retro-reflective light diffusion screen display systems described above. For example, the screen 2305 in the multi-view-window-based display system may be any of the retro-reflective diffusion screens discussed previously. The imaging element 2320 may be a regular lens, a Fresnel lens, a concave mirror, or combination of these which act as an imaging lens.

The optical focusing element 2320 is positioned relative to the multi-view-window-based display system such that the viewing windows 2310 of the display system are at the focal plane of the optical element 2320. When the projectors/viewing windows 2310 are placed at the focal plane of the imaging element 2320, the projected viewing windows are located at infinity or may be considered to be effectively at infinity. In this case, all the rays from the same viewing window are parallel with each other. Therefore, on the display, the displayed images are a set of parallel projection images 2340. In embodiments, the screen 2305 position may be the same as discussed with respect to the other embodiments, above.

For viewing window based displays, a viewer sees a pair of stereo images from two viewing windows when he/she aligns his/her eyes with the viewing windows. The observed stereo images are mosaiced images from multiple image sources when he/she stands in front of or behind the viewing windows. For the parallel projection embodiment discussed above, the viewing window is at infinity, which means that a viewer is always in front of the viewing windows. Therefore, he or she will see a pair of mosaiced images from a plurality of the projectors. By viewing a pair of stereo images, one with each eye, a viewer can see a floating three-dimensional image.

3. Light-field Aerial Three-Dimensional Image Displays

Figure 24:
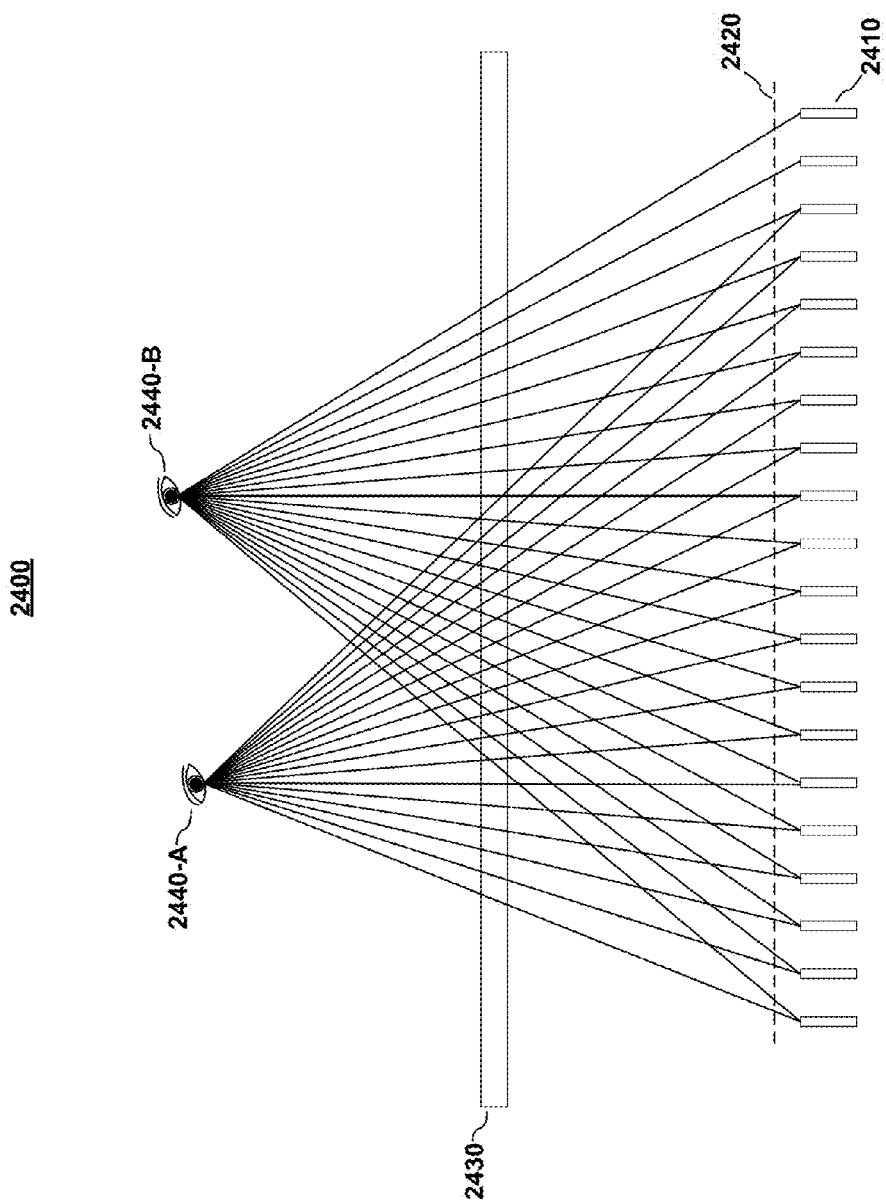
FIG. 24 illustrates operation of a rear projector image display with observers viewing images from different positions.

Embodiments of a prior section used multi-view-window-based display systems with one or more optical focusing elements to create aerial three-dimensional image display systems; that is, systems the allowed a user to see three-dimensional images as if they were floating. Those systems produced viewing windows, each with a perspective image. When a viewer viewed one image in one viewing window with one eye and another image in another viewing window with his/her other eye, a floating three-dimensional image appeared to the viewer. In alternative embodiments presented in this section, an aerial three-dimensional image display system is formed using a multi-view-window-based display system with one or more optical focusing elements. However, the embodiments depicted in this section are configured to produce a light-field aerial three-dimensional image display, not a viewing window aerial three-dimensional image display. As will be explained in more detail below, the embodiments in this section essentially produce a rear projection system, and as such, a viewer sees a floating three-dimensional image, not by looking a two different viewing windows that each have a perspective image, but rather, by seeing an image that is formed as a mosaic from a set of projectors/viewing windows. Such a rear projection system is sometime also referred to as a "light-field" display system. FIG. 24 illustrates an application of a light-field display.

FIG. 24 illustrates operation of a rear projector image display, or light-field display system, with observers viewing images from different positions. Depicted in the FIG. 24 are a set of rear projectors 2410 that project light through a screen 2430. Points on the screen 2430 emit light of different color and intensity depending upon the angle. The light-field display 2400 generates each view (e.g., 2440-A and 2440-B) with the multiple projectors 2410 according to an angle of viewing. Accordingly, different perspective images are reproduced by dividing an image into image strips and having these image strips form a mosaic that is a perspective image of the three-dimensional display 2400. For example, a viewer at position 2440-A will see one mosaic of image strips that form a first perspective image, but a viewer (or the other eye of the same viewer) at position 2440-B will see a different mosaic of image strips that form a second, different perspective image. An alternative explanation for light-field display is that for each pixel on the screen, the ray of light in a different direction is a different color since different rays are from different image sources.

Figure 25:
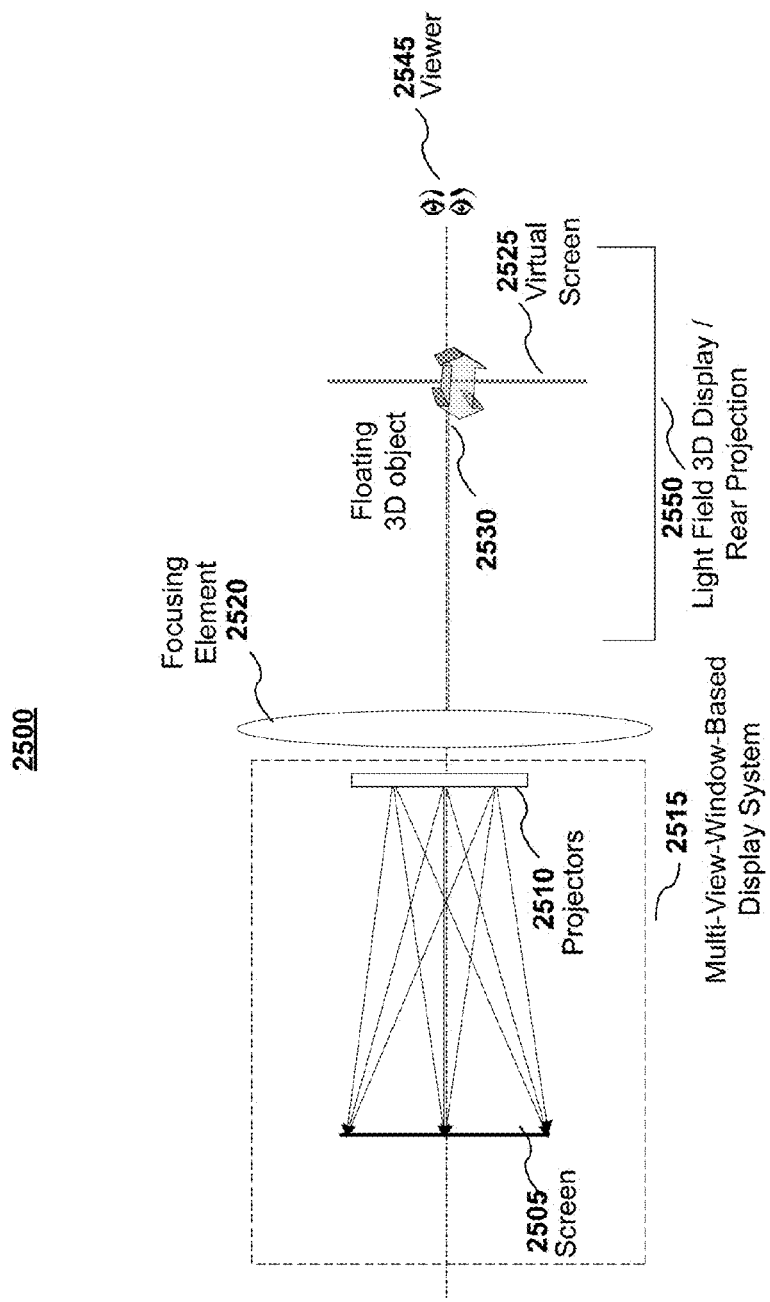
FIG. 25 illustrates an embodiment of an aerial three-dimensional image display system that forms a rear projection/light-field type display system according to various embodiments of the invention.

This principle of rear projection/light-field display can be applied to embodiments of the present invention to generate an aerial three-dimensional display system. Consider, by way of illustration and not limitation, the embodiment depicted in FIG. 25. FIG. 25 illustrates an embodiment of an aerial three-dimensional image display system that forms a rear projection/light-field type display system according to various embodiments of the invention.

As shown in FIG. 25, the display system 2500 comprises a multi-view-window-based display system 2515 and a focusing element 2520. The multi-view-window-based display system 2515 of the aerial three-dimensional image display system 2500 may be any multi-view-window-based display system. In embodiments, the multi-view-window-based display system 2515 may utilize any of the embodiments of the retro-reflective light diffusion screen display systems described above. For example, the screen 2505 in the multi-view-window-based display system 2515 may be any of the retro-reflective diffusion screens discussed previously. The optical focusing element 2520 may be a regular lens, a Fresnel lens, a concave mirror, or combination of these which act as an optical focusing element.

The optical focusing element 2520 is positioned relative to the multi-view-window-based display system 2515 such that the multi-view windows 2510 formed by the multi-view-window-based display system 2515 effectively form rear projectors, the light of which are captured by the optical element 2520 to form a virtual screen 2525 at another location. A viewer 2545 properly positioned to view the virtual screen images 2525 will see a floating three-dimensional image 2530. Since the displayed image 2530 appears to be presented as on a virtual screen 2525, the three-dimensional image 2530 will appear as if floating in air.

In addition to converting a viewing window type display system to a rear-projection/light-field type display system, the embodiments of this section differ from the embodiments of the preceding sections in that they can produce systems that are more compact, spatially. Only the physical screen (e.g., 2505) and the virtual screen (e.g., 2525) are outside the focal point of the optical focusing element. The physical screen and the virtual screen are optically conjugate with each other. The viewing windows (e.g., 2510) are located inside the focal point. As a result, the floating display system becomes a rear-projection/light-field type display system, and it can be more compact than embodiments of the prior sections.

It should be noted that, similar to the embodiments of the prior sections, the size and location of the virtual screen and the virtual projection windows can be changed by changing the location of the actual screen and the viewing windows.

Figure 26:
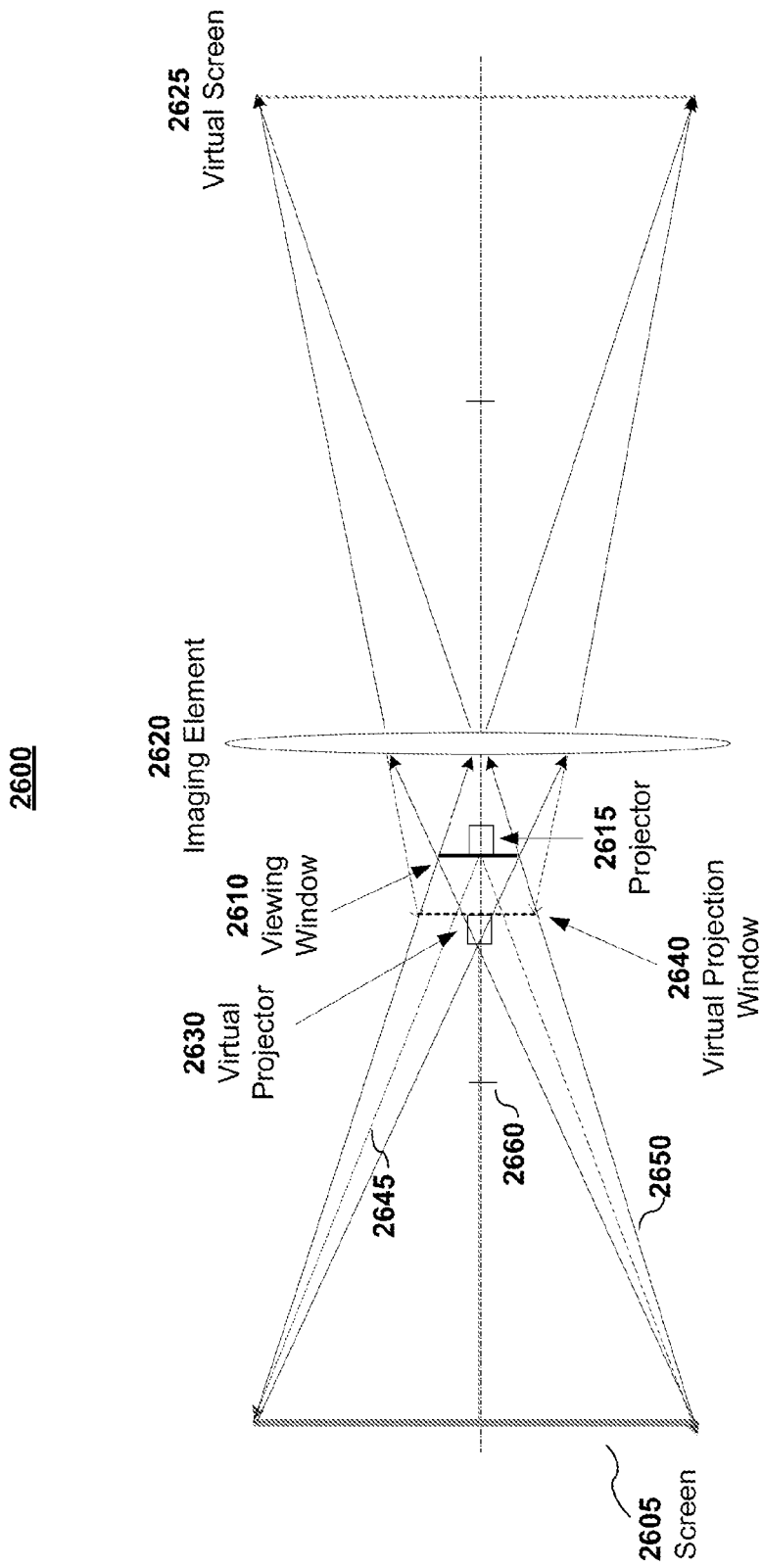
FIG. 26 illustrates ray tracing of a single projector in an embodiment of a light-field aerial three-dimensional image display system according to various embodiments of the invention.

FIG. 26 illustrates ray tracing of an embodiment of an aerial three-dimensional image display system according to various embodiments of the invention. To simply the ray tracing, only a single projector 2615 of a multi-viewing-window and its emitted light are shown.

FIG. 26 illustrates ray tracing of a single projector in an embodiment of a light-field aerial three-dimensional image display system according to various embodiments of the invention. As shown in FIG. 26, the projector 2615 projects images or videos on the screen 2605. The rays (e.g., 2645) from the projector 2615 are retro-reflected back to the projector and diffused with a small diffusion angle by the screen 2605. As a result, a viewing window 2610 is formed at the projection point of the projector 2615, and the viewing window is positioned within the focal point 2660 of the focusing element 2620. The reflected rays (e.g., 2650) continue to propagate and pass the projector, and are focused by the optical focusing element 2620 to form a virtual screen 2625 in three-dimensional space at the other side of the imaging element 2620. Unlike the embodiments of the prior sections where a projected viewing window is formed at the same side as the virtual screen, in the embodiments of this section, the image of the viewing window is located at the same side as the projector (and the viewing window). The image of the viewing window is called virtual projection window 2640.

The virtual screen 2625 is optically conjugate with the physical screen 2605 and the virtual projection window 2640 is optically conjugate with the viewing window 2610 at the projection point. By adding more projectors, more viewing windows, as well as their images (the virtual projection windows) are formed.

Figure 27:
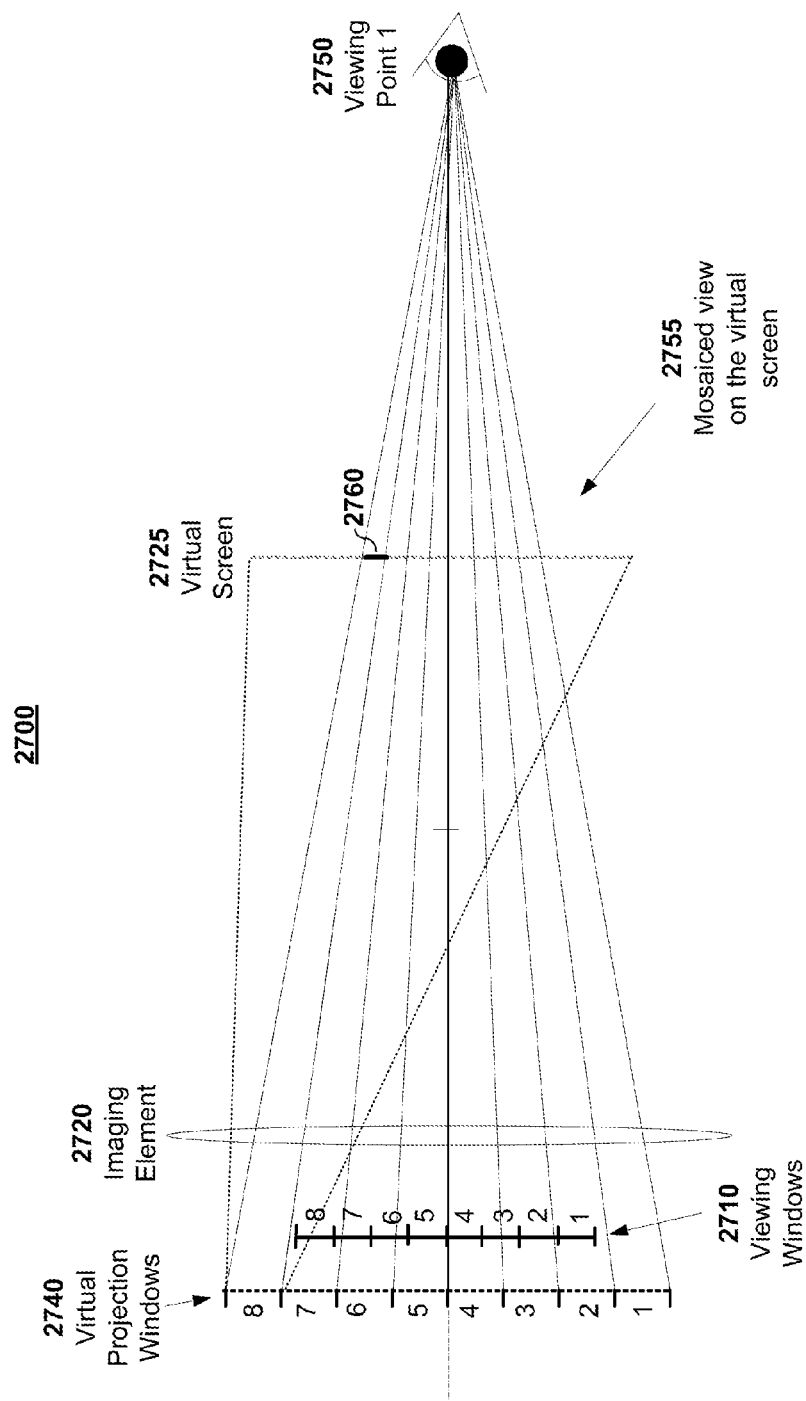
FIG. 27 illustrates the operation of a light-field aerial three-dimensional image display system according to various embodiments of the invention.

FIG. 27 illustrates the operation of a light-field, aerial three-dimensional image display system according to various embodiments of the invention. This figure illustrates how the system works with multiple viewing windows/projectors. Depicted in FIG. 27 are eight (8) viewing windows 2710, which are imaged as eight (8) virtual projection windows 2740. A viewer 2750 sees a mosaiced image 2755 on the virtual screen 2725. For example, observing at the viewing point 2750, an image segment 2760, which in 2D is a vertical stripe, of the observed image is part of the image from virtual projection window 8, and originally from image source 8 (viewing window 8). Similarly, other segments are from other corresponding virtual projection windows.

Figure 28:
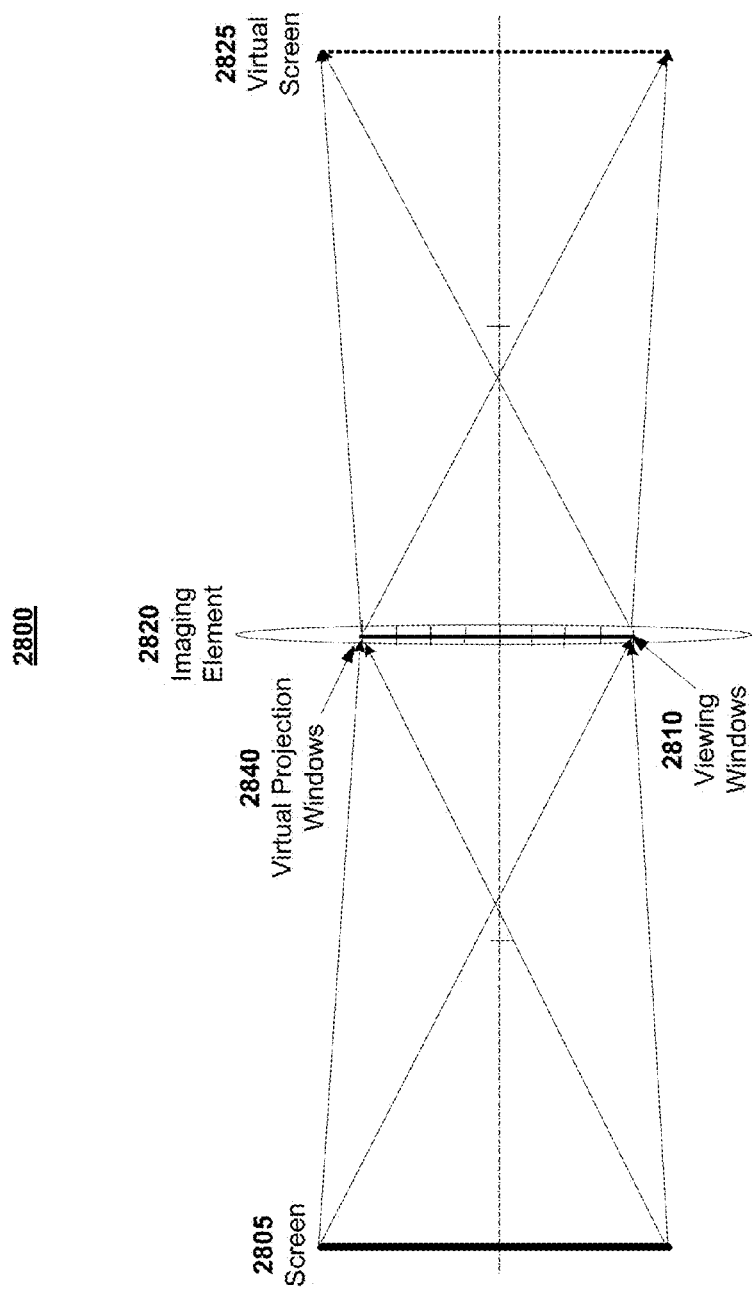
FIG. 28 illustrates an embodiment of a light-field aerial three-dimensional image display system according to various embodiments of the invention.

Turning now to FIG. 28, an embodiment of a light-field, aerial three-dimensional image display system 2800 according to various embodiments of the invention is depicted. In the depicted embodiment, the projectors are placed at the principal plane of the optical focusing element 2820. As a result, the viewing windows 2810 overlap with the principal plane of the imaging lens 2820, and their images (the virtual projection windows 2840) are the same as the viewing windows both in size and location. The size and location of the virtual screen 2825 can be changed by changing the size and location of the actual physical screen 2805. It should be noted that this embodiment uses a thin lens model; for a lens group or thick lens, there are a pair of principal plane, the viewing windows and the virtual projection windows would be on one of the principal planes respectively.

The embodiment depicted in FIG. 28 has several advantages. First, as noted previously, such a configuration has a compact design. Because the projectors can be in the principal plane of the optical focusing element, the space required, particularly as compared to the embodiments of the prior sections, is less. Second, there is little or no distortion of the projection windows. Finally, it is less difficult to design a high quality imaging lens for such embodiments because one only needs to optimize the lens for a single pair of image planes.

Figure 29C:
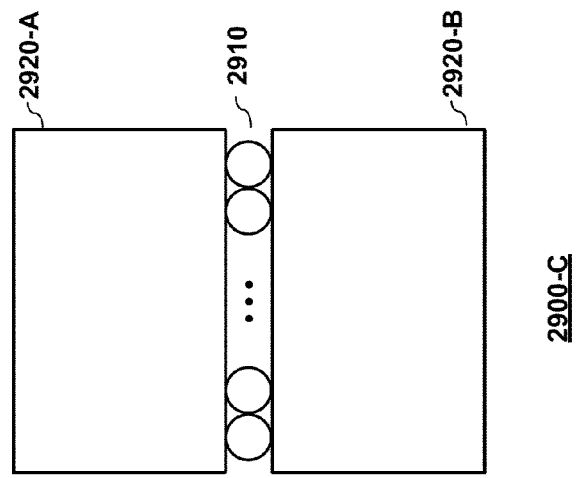
FIGS. 29A-C illustrate different embodiments of projector and optical element arrangements of a light-field aerial three-dimensional image display system according to various embodiments of the invention.
Figure 29A:
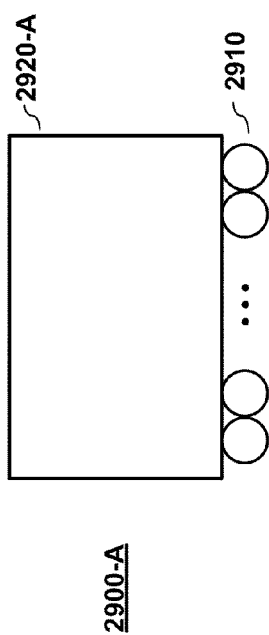
Figure 29B:
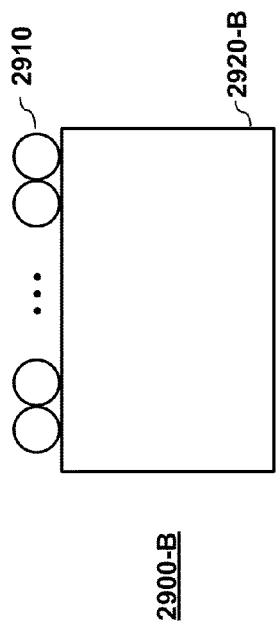

FIGS. 29A-C illustrate different embodiments of projectors and optical focusing element arrangements of a light-field aerial three-dimensional image display system according to various embodiments of the invention. The embodiments depicted in FIGS. 29A-C may be of particular use for a light-field aerial three-dimensional image display system as depicted in FIG. 28.

FIG. 29A depicts an embodiment of a projector and optical focusing element configuration 2900-A. In the depicted embodiment, a set of projectors 2910 are positioned beneath a focusing element 2920-A, which may comprise one or more optical focusing elements.

FIG. 29B depicts another embodiment of a projector and optical focusing element configuration 2900-B. In the depicted embodiment, a set of projectors 2910 are positioned above a focusing element 2920-B, which may comprise one or more optical focusing elements.

FIG. 29C depicts yet another embodiment of a projector and optical focusing element configuration 2900-C. In the depicted embodiment, a set of projectors 2910 are positioned between two focusing elements 2920-A and 2920-B, each of which may comprise one or more optical focusing elements.

Figure 30:
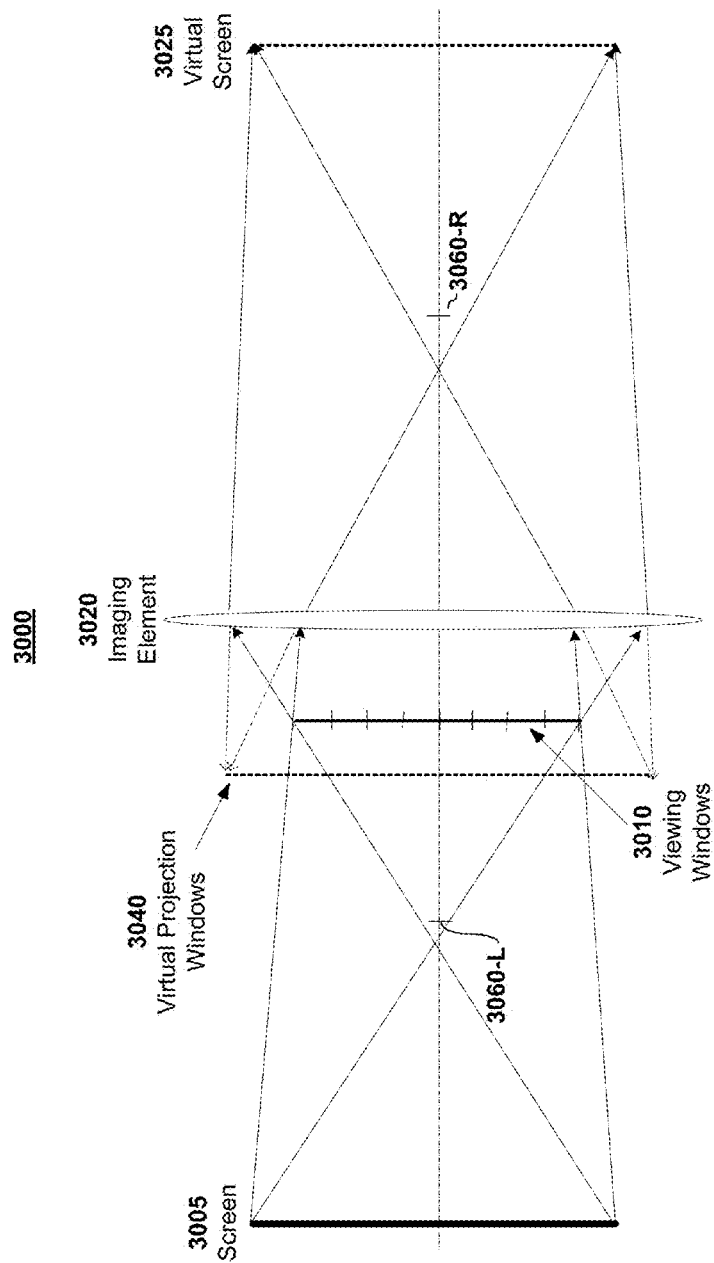
FIG. 30 illustrates another embodiment of a light-field aerial three-dimensional image display system according to various embodiments of the invention.

FIG. 30 illustrates another embodiment of a light-field aerial three-dimensional image display system according to various embodiments of the invention. In the depicted embodiment 3000, the viewing windows 3010 are at the same side of the optical focusing element 3020 as the screen 3005 but are still within the focal point of the optical element 3060-L. The size of the virtual projection window 3040 is magnified as compared with that of the original viewing window 3010.

Figure 31:
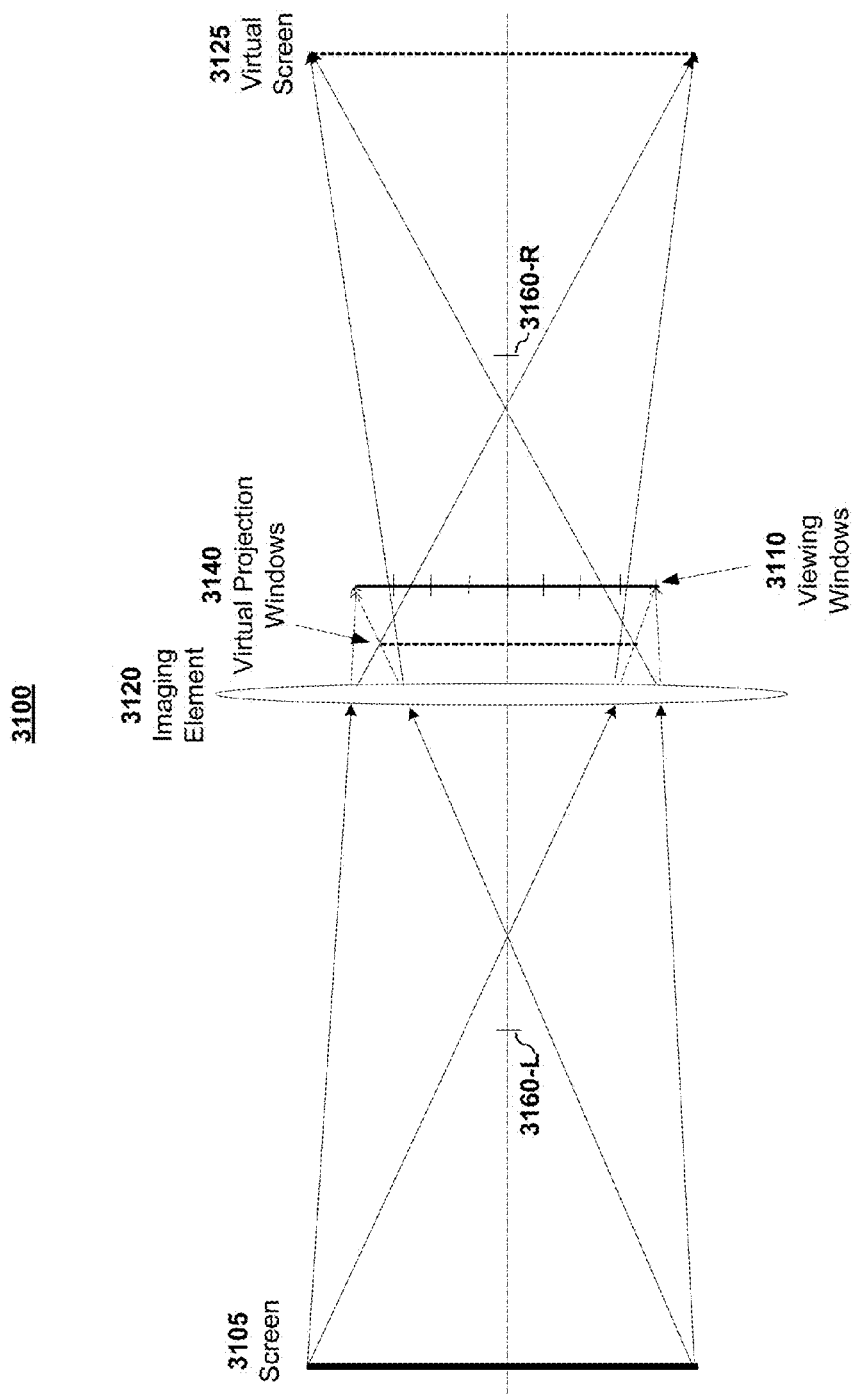
FIG. 31 illustrates yet another embodiment of a light-field aerial three-dimensional image display system according to various embodiments of the invention.

FIG. 31 illustrates yet another embodiment of a light-field aerial three-dimensional image display system according to various embodiments of the invention. In the depicted embodiment 3100, the viewing windows 3110 are on the opposite side of the optical focusing element 3120 as the screen 3105, which may be considered to be within the left focal point 3160-L of optical focusing element 3120. The size of the virtual projection window 3140 is minified as compared with that of the original viewing window 3110.

In the aforementioned embodiments, the viewing windows can theoretically be positioned from the left focal point to right infinity. The virtual projection windows will range from left infinity, when the viewing windows are close to the left focal point, to the right focal point, when the viewing windows are close to the right infinity.

F. Display System Embodiments

Figure 32:
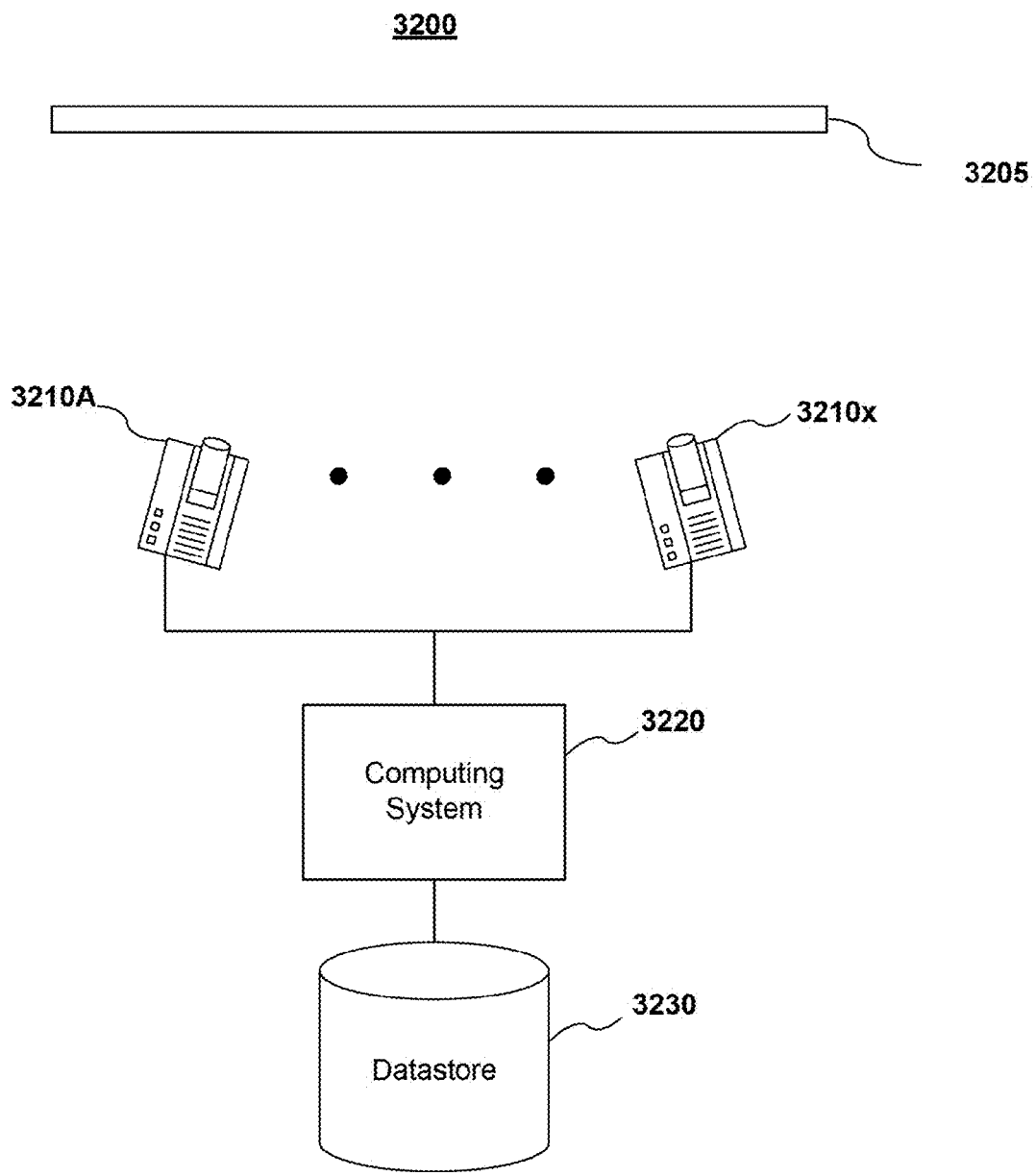
FIG. 32 illustrates a multi-projector display system according to various embodiments of the invention.

FIG. 32 illustrates a multi-projector display system according to various embodiments of the invention. In embodiments, the system comprises a retro-reflective light diffusion screen 3205 and a plurality of projectors 3210. In the depicted system 3200, the projectors 3210A-x may be under the control of a computing system 3220. In embodiments, the computing system contains, or alternatively is communicatively connected to, a datastore 3230 that stores a set of images. The computing system 3220 coordinates the displaying of images on the screen 3205 via the projectors 3210A-x to generate an autostereoscopic display.

One skilled in the art shall recognize that system depicted in FIG. 32 may be configured in a number of different ways, include without limitation, using one or more of the configurations illustrated in FIGS. 5-10, 12, 15-22, and 24-31. No particular configuration is critical to the present invention.

It shall be noted that the present invention may be implemented using an instruction-execution/computing device or system capable of processing data, including without limitation, a general-purpose computer and a specific computer, such as one intended for data or image processing. The present invention may also be implemented with other computing devices and systems. Furthermore, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 33:
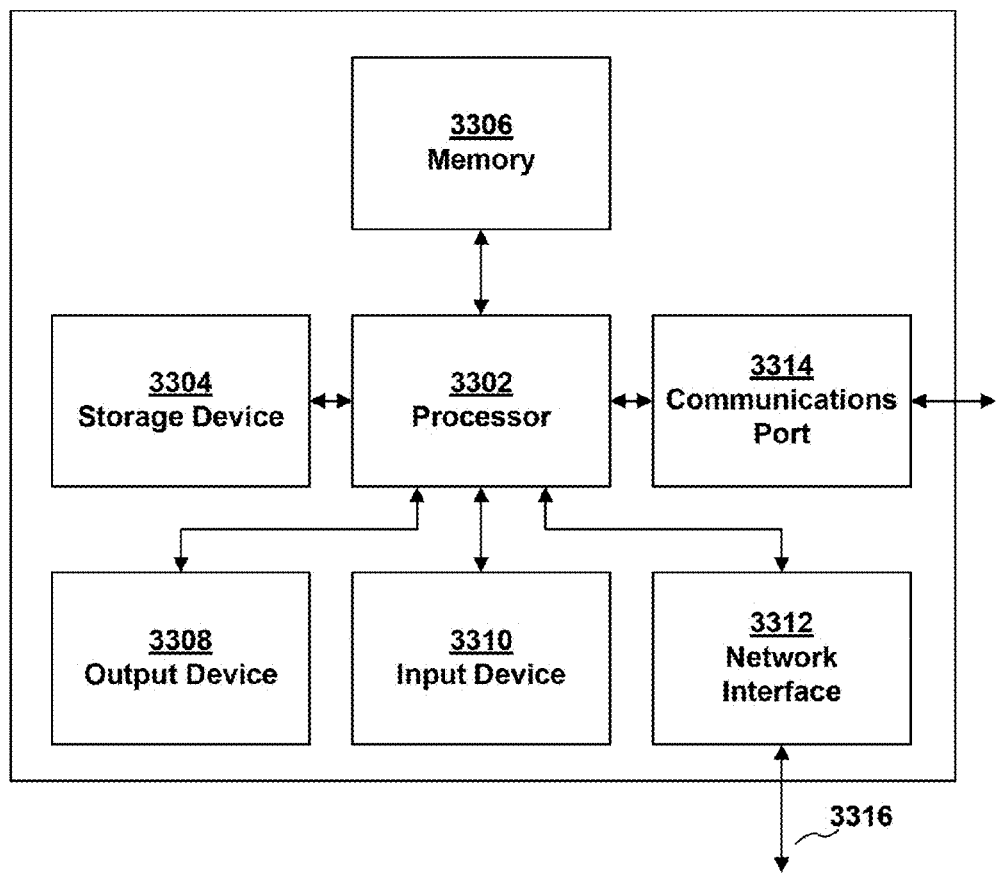
FIG. 33 depicts a block diagram of an example of a computing system according to embodiments of the invention.

FIG. 33 depicts a functional block diagram of an embodiment of an instruction-execution/computing device 3300 that may be implemented with embodiments of the present invention. As illustrated in FIG. 33, a processor 3302 executes software instructions and interacts with other system components. In an embodiment, processor 3302 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 3304, coupled to processor 3302, provides long-term storage of data and software programs. Storage device 3304 may be a hard disk drive and/or another device capable of storing data, such as a magnetic or optical media (e.g., diskettes, tapes, compact disk, DVD, and the like) drive or a solid-state memory device. Storage device 3304 may hold programs, instructions, and/or data for use with processor 3302. In an embodiment, programs or instructions stored on or loaded from storage device 3304 may be loaded into memory 3306 and executed by processor 3302. In an embodiment, storage device 3304 holds programs or instructions for implementing an operating system on processor 3302. In embodiments, possible operating systems include, but are not limited to, UNIX, AIX, LINUX, Microsoft Windows, and the Apple MAC OS. In embodiments, the operating system executes on, and controls the operation of, the computing system 3300. In embodiments, the datastore 3330 may be storage 3304.

An addressable memory 3306, coupled to processor 3302, may be used to store data and software instructions to be executed by processor 3302. Memory 3306 may be, for example, firmware, read only memory (ROM), flash memory, non-volatile random access memory (NVRAM), random access memory (RAM), or any combination thereof. In one embodiment, memory 3306 stores a number of software objects, otherwise known as services, utilities, components, or modules. One skilled in the art will also recognize that storage 3304 and memory 3306 may be the same items and function in both capacities. In an embodiment, one or more of the software components or modules may be stored in memory 3304, 3306 and executed by processor 3302.

In an embodiment, computing system 3300 provides the ability to communicate with other devices, other networks, or both. Computing system 3300 may include one or more network interfaces or adapters 3312, 3314 to communicatively couple computing system 3300 to other networks and devices. For example, computing system 3300 may include a network interface 3312, a communications port 3314, or both, each of which are communicatively coupled to processor 3302, and which may be used to couple computing system 3300 to other computer systems, networks, and devices.

In an embodiment, computing system 3300 may include one or more output devices 3308, coupled to processor 3302, to facilitate displaying graphics and text. Output devices 3308 may include, but are not limited to, a projector, a display, LCD screen, CRT monitor, printer, touch screen, or other device for displaying information. Computing system 3300 may also include a graphics adapter (not shown) to assist in displaying information or images on output device 3308.

One or more input devices 3310, coupled to processor 3302, may be used to facilitate user input. Input device 3310 may include, but are not limited to, a pointing device, such as a mouse, trackball, or touchpad, and may also include a keyboard or keypad to input data or instructions into computing system 3300.

In an embodiment, computing system 3300 may receive input, whether through communications port 3314, network interface 3312, stored data in memory 3304/3306, or through an input device 3310, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A system for generating an aerial three-dimensional image comprising:
   a multi-view-window three-dimensional display system that generates a plurality of viewing windows; and
   an optical focusing element that is positioned at a distance that is greater than a focal length of the optical focusing element from the plurality of viewing windows of the multi-view-window three-dimensional display system and that receives light from the multi-view-window three-dimensional display system and focuses the light to form a plurality of projected viewing windows,
   the plurality of projected viewing windows being positioned such that a user can view an aerial three-dimensional image by viewing a first unique perspective image with a first eye at a first projected viewing window selected from the plurality of projected viewing windows and by viewing a second unique perspective image with a second eye at a second projected viewing window from the plurality of projected viewing windows.

2. The system of claim 1 wherein the optical focusing element is a lens or a concave mirror.

3. The system of claim 2 further comprising a beamsplitter positioned between the multi-view-window three-dimensional display system and the concave mirror.

4. The system of claim 1 wherein the multi-view-window three-dimensional display system comprises:
   a screen comprising:
      a two-dimensional retro-reflective surface configured to retro-reflect an image that passed through a diffusion layer to form a reflected image; and
      the diffusion layer that receives the reflected image from the two-dimensional retro-reflective surface and diffuses the reflected image to form a viewing window corresponding to the image by diffusing the reflected image by a large diffusion angle in a first direction and diffusing the reflected image by a small diffusion angle in a second direction.

5. The system of claim 4 wherein the screen further comprises:
   a transparent medium, positioned between the two-dimensional retro-reflective surface and the diffusion layer, that allows the image to be out of focus at the two-dimensional retro-reflective surface and wherein at least a portion of the out-of-focus image that was not retro-reflected by the two-dimensional retro-reflective surface is diffused by the diffusion layer.

6. The system of claim 4 wherein the multi-view-window three-dimensional display system further comprises:
   a plurality of projectors, each projector having a unique position and configured to project an image with a perspective view onto the screen to form a viewing window corresponding to the projected image.

7. The system of claim 1 wherein the multi-view-window three-dimensional display system comprises:
   a screen comprising:
      a lenticular layer that receives an image and focuses the image onto a light diffuser layer and that receives a diffused reflected image from the light diffuser layer and focuses the diffused reflected image to form a viewing window;
      the light diffuser layer, position at the focal plane of the lenticular layer, that receives the image from the lenticular layer and that receives a reflected image from a two-dimensional retro-reflective surface and diffuses the reflected image to form the diffused reflected image; and the two-dimensional retro-reflective surface that receives the image from the light diffuser layer and retro-reflects at least a portion of the image back to the light diffuser layer to form the reflected image.

8. The system of claim 7 wherein the screen further comprises:

a transparent medium, positioned between the two-dimensional retro-reflective surface and the light diffuser layer, that allows the image to be out of focus at the two-dimensional retro-reflective surface and wherein at least a portion of the out-of-focus image that was not retro-reflected by the two-dimensional retro-reflective surface is diffused by the light diffuser layer.

9. A system for generating an aerial three-dimensional image comprising:

a multi-view-window three-dimensional display system, comprising a plurality of projectors that project a plurality of projected images, that generates a plurality of viewing windows; and an optical focusing element positioned at a distance that is less than a focal length of the optical focusing element from the plurality of viewing windows of the multi-view-window three-dimensional display system and that receives light from the multi-view-window three-dimensional display system and focuses the light to form a plurality of composite images, each composite image being formed by a plurality of image portions from the plurality of projected images and each composite image being viewable from a unique viewpoint area;

wherein an aerial three-dimensional image is viewable by a viewer seeing a first perspective image with a first eye at a first viewpoint area and seeing a second perspective image with a second eye at a viewpoint area.

10. The system of claim 9 wherein the plurality of projectors are positioned at a principal plane of the optical focusing element.

11. The system of claim 9 wherein the multi-view-window three-dimensional display system further comprises:

a screen comprising:

a two-dimensional retro-reflective surface configured to retro-reflect an image that passed through a diffusion layer to form a reflected image; and the diffusion layer that receives the reflected image from the two-dimensional retro-reflective surface and diffuses the reflected image to form a viewing window corresponding to the image by diffusing the reflected image by a large diffusion angle in a first direction and diffusing the reflected image by a small diffusion angle in a second direction.

12. The system of claim 11 wherein the optical focusing element is positioned between the plurality of viewing windows and the screen.

13. The system of claim 11 wherein the screen further comprises:

a transparent medium, positioned between the two-dimensional retro-reflective surface and the diffusion layer, that allows the image to be out of focus at the two-dimensional retro-reflective surface and wherein at least a portion of the out-of-focus image that was not retro-reflected by the two-dimensional retro-reflective surface is diffused by the diffusion layer.

14. The system of claim 9 wherein the multi-view-window three-dimensional display system comprises:

a screen comprising:

a lenticular layer that receives an image and focuses the image onto a light diffuser layer and that receives a diffused reflected image from the light diffuser layer and focuses the diffused reflected image to form a viewing window;

the light diffuser layer, positioned at the focal plane of the lenticular layer, that receives the image from the lenticular layer and that receives a reflected image from a two-dimensional retro-reflective surface and diffuses the reflected image to form the diffused reflected image; and the two-dimensional retro-reflective surface that receives the image from the light diffuser layer and retro-reflects at least a portion of the image back to the light diffuser layer to form the reflected image.

15. The system of claim 14 wherein the screen further comprises:

a transparent medium, positioned between the two-dimensional retro-reflective surface and the light diffuser layer, that allows the image to be out of focus at the two-dimensional retro-reflective surface and wherein at least a portion of the out-of-focus image that was not retro-reflected by the two-dimensional retro-reflective surface is diffused by the light diffuser layer.

16. A method for generating an aerial three-dimensional display system comprising:

generating a plurality of viewing windows using a multi-view-window three-dimensional display system;

using an optical focusing element that is positioned at a distance that is greater than a focal length of the optical focusing element from the plurality of viewing windows of the multi-view-window three-dimensional display system to receive light from the multi-view-window three-dimensional display system and focus the light to form a plurality of projected viewing windows, the plurality of projected viewing windows being positioned such that a user can view an aerial three-dimensional image by viewing a first unique perspective image with a first eye at a first projected viewing window selected from the plurality of projected viewing windows and by viewing a second unique perspective image with a second eye at a second projected viewing window from the plurality of projected viewing windows.

17. The method of claim 16 wherein the optical focusing element is a lens or a concave mirror.

18. The method of claim 16 wherein the multi-view-window three-dimensional display system comprises:

a screen comprising:

a two-dimensional retro-reflective surface configured to retro-reflect an image that passed through a diffusion layer to form a reflected image; and the diffusion layer that receives the reflected image from the two-dimensional retro-reflective surface and diffuses the reflected image to form a viewing window corresponding to the image by diffusing the reflected image by a large diffusion angle in a first direction and diffusing the reflected image by a small diffusion angle in a second direction.

19. The method of claim 18 wherein the screen further comprises:

a transparent medium, positioned between the two-dimensional retro-reflective surface and the diffusion layer, that allows the image to be out of focus at the two-dimensional retro-reflective surface and wherein at least a portion of the out-of-focus image that was not retro-reflected by the two-dimensional retro-reflective surface is diffused by the diffusion layer.

20. The method of claim 16 wherein the multi-view-window three-dimensional display system comprises:
   a screen comprising:
      a lenticular layer that receives an image and focuses the image onto a light diffuser layer and that receives a diffused reflected image from the light diffuser layer and focuses the diffused reflected image to form a viewing window;
      the light diffuser layer, positioned at the focal plane of the lenticular layer, that receives the image from the lenticular layer and that receives a reflected image from a two-dimensional retro-reflective surface and diffuses the reflected image to form the diffused reflected image; and
      the two-dimensional retro-reflective surface that receives the image from the light diffuser layer and retro-reflects at least a portion of the image back to the light diffuser layer to form the reflected image.

21. A method for generating an aerial three-dimensional image comprising:
   generating a plurality of viewing windows using a multi-view-window three-dimensional display system that comprises a plurality of projectors that project a plurality of projected images; and
   using an optical focusing element positioned at a distance that is less than a focal length of the optical focusing element from the plurality of viewing windows of the multi-view-window three-dimensional display system to receive light from the multi-view-window three-dimensional display system and focus the light to form a plurality of composite images, each composite image being formed by a plurality of image portions from the plurality of projected images and each composite image being viewable from a unique viewpoint area;
   wherein an aerial three-dimensional image is viewable by a viewer seeing a first perspective image with a first eye at a first viewpoint area and seeing a second perspective image with a second eye at a viewpoint area.

22. The method of claim 21 wherein the plurality of projectors are positioned at a principal plane of the optical focusing element.

23. The method of claim 21 wherein the multi-view-window three-dimensional display system further comprises:
   a screen comprising:
      a two-dimensional retro-reflective surface configured to retro-reflect an image that passed through a diffusion layer to form a reflected image; and
      the diffusion layer that receives the reflected image from the two-dimensional retro-reflective surface and diffuses the reflected image to form a viewing window corresponding to the image by diffusing the reflected image by a large diffusion angle in a first direction and diffusing the reflected image by a small diffusion angle in a second direction.

24. The method of claim 23 wherein the optical focusing element is positioned between the plurality of viewing windows and the screen.

* * * * *